(12) United States Patent
Downey et al.

(10) Patent No.: US 11,799,787 B2
(45) Date of Patent: *Oct. 24, 2023

(54) DISTRIBUTED UNMANNED AERIAL VEHICLE ARCHITECTURE

(71) Applicant: Skydio, Inc., Redwood City, CA (US)

(72) Inventors: Jonathan Downey, San Francisco, CA (US); Bernard J. Michini, San Francisco, CA (US); Brian Richman, San Francisco, CA (US)

(73) Assignee: Skydio, Inc., San Mateo, CA (US)

( * ) Notice: Subject to any disclaimer, the term of this patent is extended or adjusted under 35 U.S.C. 154(b) by 539 days.

This patent is subject to a terminal disclaimer.

(21) Appl. No.: 17/007,618

(22) Filed: Aug. 31, 2020

(65) Prior Publication Data

US 2021/0058331 A1 Feb. 25, 2021

Related U.S. Application Data

(63) Continuation of application No. 15/174,387, filed on Jun. 6, 2016, now Pat. No. 10,764,196, which is a (Continued)

(51) Int. Cl.
*H04L 47/25* (2022.01)
*G01C 23/00* (2006.01)
(Continued)

(52) U.S. Cl.
CPC .......... *H04L 47/25* (2013.01); *B64C 39/024* (2013.01); *B64D 41/00* (2013.01); *B64D 47/00* (2013.01);
(Continued)

(58) Field of Classification Search
CPC .......... B64C 39/024; B64C 2201/126; B64C 2201/145; H04L 47/25; B64D 47/00; G01C 23/00; G05D 1/0022
See application file for complete search history.

(56) References Cited

U.S. PATENT DOCUMENTS 5,445,911 A 8/1995 Russell et al.
5,550,736 A 8/1996 Hay et al.
(Continued)

FOREIGN PATENT DOCUMENTS

EP 0758972 12/1997
EP 1677172 A2 7/2006
(Continued)

OTHER PUBLICATIONS

International Search Report and Written Opinion dated May 30, 2013 for International Application No. PCT/US2013/051227.
(Continued)

*Primary Examiner* — Christopher P Ellis
(74) *Attorney, Agent, or Firm* — Young Basile Hanlon & MacFarlane, P.C.

(57) ABSTRACT

Methods, systems, and apparatus, including computer programs encoded on computer storage media, for a distributed system architecture for unmanned air vehicles. One of the methods includes obtaining information identifying flight information of a UAV, with the flight information including flight phase information or a contingency condition associated with a flight critical module included in the UAV. The obtained information is analyzed, and one or more first payload modules are determined to enter a modified power state. Requests to enter the modified power state are caused to be transmitted to each determined payload module in the one or more first payload modules.

20 Claims, 17 Drawing Sheets

Related U.S. Application Data continuation of application No. 15/019,165, filed on Feb. 9, 2016, now Pat. No. 9,403,593, which is a continuation of application No. 14/709,263, filed on May 11, 2015, now Pat. No. 9,273,981.

(60) Provisional application No. 61/991,806, filed on May 12, 2014.

(51) Int. Cl.
| | |
|---|---|
| *G05D 1/00* | (2006.01) |
| *B64C 39/02* | (2023.01) |
| *B64D 41/00* | (2006.01) |
| *B64D 47/00* | (2006.01) |
| *B64D 47/08* | (2006.01) |
| *B64U 101/00* | (2023.01) |
| *B64U 101/30* | (2023.01) |
| *B64U 101/60* | (2023.01) |

(52) U.S. Cl.
CPC ............. *B64D 47/08* (2013.01); *G01C 23/00* (2013.01); *G05D 1/0022* (2013.01); *B64U 2101/00* (2023.01); *B64U 2101/30* (2023.01); *B64U 2101/60* (2023.01); *B64U 2201/104* (2023.01)

(56) References Cited

U.S. PATENT DOCUMENTS

| | | |
|---|---|---|
| 6,122,572 A | 9/2000 | Yavnai |
| 6,176,451 B1 | 1/2001 | Drymon |
| 6,289,467 B1 | 9/2001 | Lewis et al. |
| 6,497,388 B1 | 12/2002 | Friend et al. |
| 6,522,867 B1 | 2/2003 | Wright et al. |
| 6,665,594 B1 | 12/2003 | Armstrong |
| 6,665,613 B2 | 12/2003 | Duvall |
| 6,754,566 B2 | 6/2004 | Shimel |
| 6,804,607 B1 | 10/2004 | Wood |
| 6,868,314 B1 | 3/2005 | Frink |
| 6,873,886 B1 | 3/2005 | Mullen et al. |
| 7,093,798 B2 | 8/2006 | Whelan et al. |
| 7,127,334 B2 | 10/2006 | Frink |
| 7,418,320 B1 | 8/2008 | Bodin et al. |
| 7,762,496 B2 | 7/2010 | Seiersen et al. |
| 7,912,630 B2 | 3/2011 | Alewine et al. |
| 7,938,362 B2 | 5/2011 | Kismarton et al. |
| 3,000,689 A1 | 8/2011 | Featherstone et al. |
| 8,073,578 B1 | 12/2011 | McCusker |
| 8,082,074 B2 | 12/2011 | Duggan et al. |
| 8,100,362 B2 | 1/2012 | Guering |
| 8,111,154 B1 | 2/2012 | Puri et al. |
| 8,213,957 B2 | 7/2012 | Bull et al. |
| 8,223,012 B1 | 7/2012 | Diem |
| 8,256,715 B2 | 9/2012 | Ballard et al. |
| 8,260,479 B2 | 9/2012 | Christenson |
| 8,284,748 B2 | 10/2012 | Borghei |
| 8,306,737 B2 | 11/2012 | Nguyen |
| 8,308,108 B2 | 11/2012 | Cazals et al. |
| 8,352,097 B2 | 1/2013 | Crumm et al. |
| 8,360,362 B2 | 1/2013 | Kismarton et al. |
| 8,412,166 B2 | 4/2013 | Ellanti et al. |
| 8,515,609 B2 | 8/2013 | Mcandrew et al. |
| 8,531,293 B2 | 9/2013 | Putz |
| 8,600,602 B1 | 12/2013 | Mcandrew et al. |
| 8,655,593 B1 | 2/2014 | Davidson |
| 8,751,144 B2 | 6/2014 | Tzao et al. |
| 8,825,225 B1 | 9/2014 | Stark et al. |
| 8,862,285 B2 | 10/2014 | Wong et al. |
| 8,874,283 B1 | 10/2014 | Cavote |
| 8,876,571 B2 | 11/2014 | Trowbridge et al. |
| 8,880,241 B2 | 11/2014 | Mohamadi |
| 8,903,568 B1 | 12/2014 | Wang et al. |
| 8,938,160 B2 | 1/2015 | Wang |
| 8,941,489 B2 | 1/2015 | Sheshadri et al. |
| 8,965,598 B2 | 2/2015 | Kruglick |
| 9,043,106 B2 | 5/2015 | Ingram et al. |
| 9,066,464 B2 | 6/2015 | Schmidt et al. |
| 9,256,225 B2 | 2/2016 | Downey et al. |
| 9,256,994 B2 | 2/2016 | Downey et al. |
| 9,273,981 B1 | 3/2016 | Downey et al. |
| 9,310,221 B1 | 4/2016 | Downey et al. |
| 9,311,760 B2 | 4/2016 | Downey et al. |
| 9,340,283 B1 | 5/2016 | Downey et al. |
| 9,403,593 B2 | 8/2016 | Downey et al. |
| 9,406,237 B2 | 8/2016 | Downey et al. |
| 9,607,522 B2 | 3/2017 | Downey et al. |
| 2002/0161489 A1 | 10/2002 | Johnson |
| 2003/0060938 A1 | 3/2003 | Duvall |
| 2003/0065428 A1 | 4/2003 | Mendelson et al. |
| 2003/0093187 A1 | 5/2003 | Walker |
| 2004/0036630 A1 | 2/2004 | Jamieson et al. |
| 2004/0068351 A1 | 4/2004 | Solomon |
| 2004/0162638 A1 | 8/2004 | Solomon |
| 2005/0004723 A1 | 1/2005 | Duggan |
| 2005/0060213 A1 | 3/2005 | Lavu et al. |
| 2005/0156715 A1 | 7/2005 | Zou et al. |
| 2005/0159883 A1 | 7/2005 | Humphries et al. |
| 2005/0195096 A1 | 9/2005 | Ward |
| 2006/0155425 A1 | 7/2006 | Howlett et al. |
| 2006/0167597 A1 | 7/2006 | Bodin et al. |
| 2006/0262781 A1 | 11/2006 | Campini et al. |
| 2006/0270421 A1 | 11/2006 | Phillips et al. |
| 2007/0069083 A1 | 3/2007 | Shams et al. |
| 2007/0100538 A1 | 5/2007 | Wise et al. |
| 2007/0112475 A1 | 5/2007 | Koebler et al. |
| 2007/0138345 A1 | 6/2007 | Shuster |
| 2007/0162669 A1 | 7/2007 | Martin et al. |
| 2007/0266192 A1 | 11/2007 | Campini et al. |
| 2008/0007928 A1 | 1/2008 | Salama et al. |
| 2008/0077299 A1 | 3/2008 | Arshad et al. |
| 2008/0094256 A1 | 4/2008 | Koen |
| 2008/0174448 A1 | 7/2008 | Hudson |
| 2008/0178463 A1 | 7/2008 | Okubora |
| 2008/0186165 A1 | 8/2008 | Bertagna et al. |
| 2008/0210809 A1 | 9/2008 | Arlton et al. |
| 2008/0255711 A1 | 10/2008 | Matos |
| 2009/0087029 A1 | 4/2009 | Coleman et al. |
| 2009/0088972 A1 | 4/2009 | Bushnell |
| 2009/0114764 A1 | 5/2009 | Builta et al. |
| 2009/0150070 A1 | 6/2009 | Alewine et al. |
| 2009/0219393 A1 | 9/2009 | Vian et al. |
| 2009/0312032 A1 | 12/2009 | Bornstein et al. |
| 2010/0004798 A1 | 1/2010 | Bodin et al. |
| 2010/0017114 A1 | 1/2010 | Tehan |
| 2010/0042940 A1 | 2/2010 | Monday et al. |
| 2010/0049987 A1 | 2/2010 | Ettorre et al. |
| 2010/0084513 A1 | 4/2010 | Gariepy |
| 2010/0100269 A1 | 4/2010 | Ekhaguere et al. |
| 2010/0131121 A1 | 5/2010 | Gerlock |
| 2010/0145556 A1 | 6/2010 | Christenson |
| 2010/0155611 A1 | 6/2010 | Fullwood et al. |
| 2010/0163621 A1 | 7/2010 | Ben-Asher et al. |
| 2010/0168937 A1 | 7/2010 | Soijer et al. |
| 2010/0198514 A1 | 8/2010 | Miralles |
| 2010/0201806 A1 | 8/2010 | Nygaard et al. |
| 2010/0235032 A1 | 9/2010 | Sung et al. |
| 2011/0022770 A1 | 1/2011 | Sullivan |
| 2011/0130636 A1 | 6/2011 | Daniel et al. |
| 2011/0130913 A1 | 6/2011 | Duggan |
| 2011/0133888 A1 | 6/2011 | Stevens et al. |
| 2011/0178811 A1 | 7/2011 | Sheridan |
| 2011/0196564 A1 | 8/2011 | Coulmeau |
| 2011/0258021 A1 | 10/2011 | Mumaw et al. |
| 2011/0264834 A1 | 10/2011 | Fletcher et al. |
| 2011/0301784 A1 | 12/2011 | Oakley et al. |
| 2011/0320068 A1 | 12/2011 | Lee et al. |
| 2012/0022719 A1 | 1/2012 | Matos |
| 2012/0035787 A1 | 2/2012 | Dunkelberger et al. |
| 2012/0044710 A1 | 2/2012 | Jones |
| 2012/0092208 A1 | 4/2012 | LeMire et al. |
| 2012/0104517 A1 | 5/2012 | Huang et al. |
| 2012/0209457 A1 | 8/2012 | Bushnell |
| 2012/0232722 A1 | 9/2012 | Fisher et al. |

(56) References Cited

U.S. PATENT DOCUMENTS

| | | |
|---|---|---|
| 2012/0233447 A1 | 9/2012 | Fitzgerald |
| 2012/0253555 A1 | 10/2012 | Stange |
| 2012/0296499 A1 | 11/2012 | Kirchhofer et al. |
| 2012/0299751 A1 | 11/2012 | Verna et al. |
| 2012/0319815 A1 | 12/2012 | Feldman |
| 2012/0320203 A1 | 12/2012 | Liu |
| 2013/0009013 A1 | 1/2013 | Bourakov et al. |
| 2013/0085669 A1 | 4/2013 | Bailey et al. |
| 2013/0099048 A1 | 4/2013 | Fisher et al. |
| 2013/0317669 A1 | 11/2013 | Jiang et al. |
| 2013/0345920 A1 | 12/2013 | Duggan et al. |
| 2014/0018979 A1 | 1/2014 | Goossen et al. |
| 2014/0025229 A1 | 1/2014 | Levien et al. |
| 2014/0032034 A1 | 1/2014 | Raptopoulos et al. |
| 2014/0142787 A1 | 5/2014 | Tillotson et al. |
| 2014/0163852 A1 | 6/2014 | Borri et al. |
| 2014/0172194 A1 | 6/2014 | Levien et al. |
| 2014/0212986 A1 | 7/2014 | Angelescu et al. |
| 2014/0222248 A1 | 8/2014 | Levien et al. |
| 2014/0227548 A1 | 8/2014 | Myrick |
| 2014/0244078 A1 | 8/2014 | Downey et al. |
| 2014/0249692 A1 | 9/2014 | Levien et al. |
| 2014/0249693 A1 | 9/2014 | Stark et al. |
| 2014/0249744 A1 | 9/2014 | Andersson |
| 2014/0277834 A1 | 9/2014 | Levien et al. |
| 2014/0303884 A1 | 10/2014 | Levien et al. |
| 2014/0319272 A1 | 10/2014 | Casado Magana et al. |
| 2014/0325644 A1 | 10/2014 | Oberg et al. |
| 2015/0115108 A1 | 4/2015 | Benson et al. |
| 2015/0142211 A1 | 5/2015 | Shehata et al. |
| 2015/0225081 A1 | 8/2015 | Stabler |
| 2015/0323930 A1 | 11/2015 | Downey et al. |
| 2015/0336671 A1 | 11/2015 | Winn et al. |
| 2015/0344148 A1 | 12/2015 | Schwartz |
| 2015/0379874 A1 | 12/2015 | Ubhi et al. |
| 2016/0025457 A1 | 1/2016 | Miralles |
| 2016/0125746 A1 | 5/2016 | Kunzi et al. |
| 2017/0178352 A1 | 6/2017 | Harmsen et al. |

FOREIGN PATENT DOCUMENTS

| | | |
|---|---|---|
| EP | 2156216 | 2/2010 |
| EP | 2212199 | 8/2010 |
| JP | 06-195125 | 7/1994 |
| JP | 08-048297 | 2/1996 |
| WO | 2013/163746 A1 | 11/2013 |

OTHER PUBLICATIONS

Extended European Search Report dated Jul. 30, 2015, regarding Application No. EP 12 83 9320, 5 pages.

International Search Report and Written Opinion of the International Searching Authority for International Application No. PCT/US2015/030229, dated Aug. 24, 2015, in 11 pages.

International Search Report and Written Opinion dated Mar. 4, 2016 for International Application No. PCT/US2015/030231.

DISTRIBUTED UNMANNED AERIAL VEHICLE ARCHITECTURE

CROSS-REFERENCE TO RELATED APPLICATIONS

Any and all applications for which a foreign or domestic priority claim is identified in the Application Data Sheet as filed with the present application are hereby incorporated by reference in their entirety under 37 CFR 1.57.

BACKGROUND

Unmanned aerial vehicles (UAVs) are utilized by governmental organizations and businesses for a wide range of reasons, with each reason requiring particular UAV modes of operation and/or particular payload to be carried by the UAV. For instance, a shipping company can include particular payload, e.g., global positioning system sensors, cameras, and a cargo holder, to track its progression along a pre-defined shipping route, and deposit the cargo at a particular location.

With the increasing usage of UAV's for disparate purpose, payload size and power requirements are becoming more of a concern. Conventionally, to ensure that a UAV does not run out of power before completing its mission, an organization can equip the UAV with a large battery, or replace payload modules with low-power versions.

SUMMARY

In general, one innovative aspect of the subject matter described in this specification can be embodied in a system included in an unmanned aerial vehicle (UAV) and in communication with one or more payload modules and one or more flight critical modules included in the UAV, the system comprising one or more processors configured to perform operations comprising: obtaining information identifying flight information of the UAV; determining, from the flight information, one or more first payload modules to enter a respective modified power state; and provide, to each determined payload module, requests to enter the respective modified power state.

Particular embodiments of the subject matter described can be implemented so as to realize one or more of the following advantages. A system can separate the control and operation of flight critical systems from payload systems. The system can guard against a payload system failure, which can consume too much power or lock up a data bus, resulting in the failure of one or more flight critical systems. Additionally, the system can negotiate power concerns between the payload systems and flight critical systems, to ensure that flight critical systems are given ample power to function properly. The system can also modify the power states of payload modules depending on the current flight phase of an unmanned aerial vehicle. For instance, during a takeoff flight phase, the included payload modules can be set to a low power state.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 8A illustrates an example user interface generated by the configuration utility for configuring and validating a UAV radio datalink.

FIG. 8B illustrates an example user interface generated by the configuration utility for configuring and validating a UAV effector port mapping.

FIG. 8C includes an example user interface generated by the configuration utility for configuring and validating radio control transmitter input settings.

Like reference numbers and designations in the various drawings indicate like elements.

DETAILED DESCRIPTION

Figure 1:
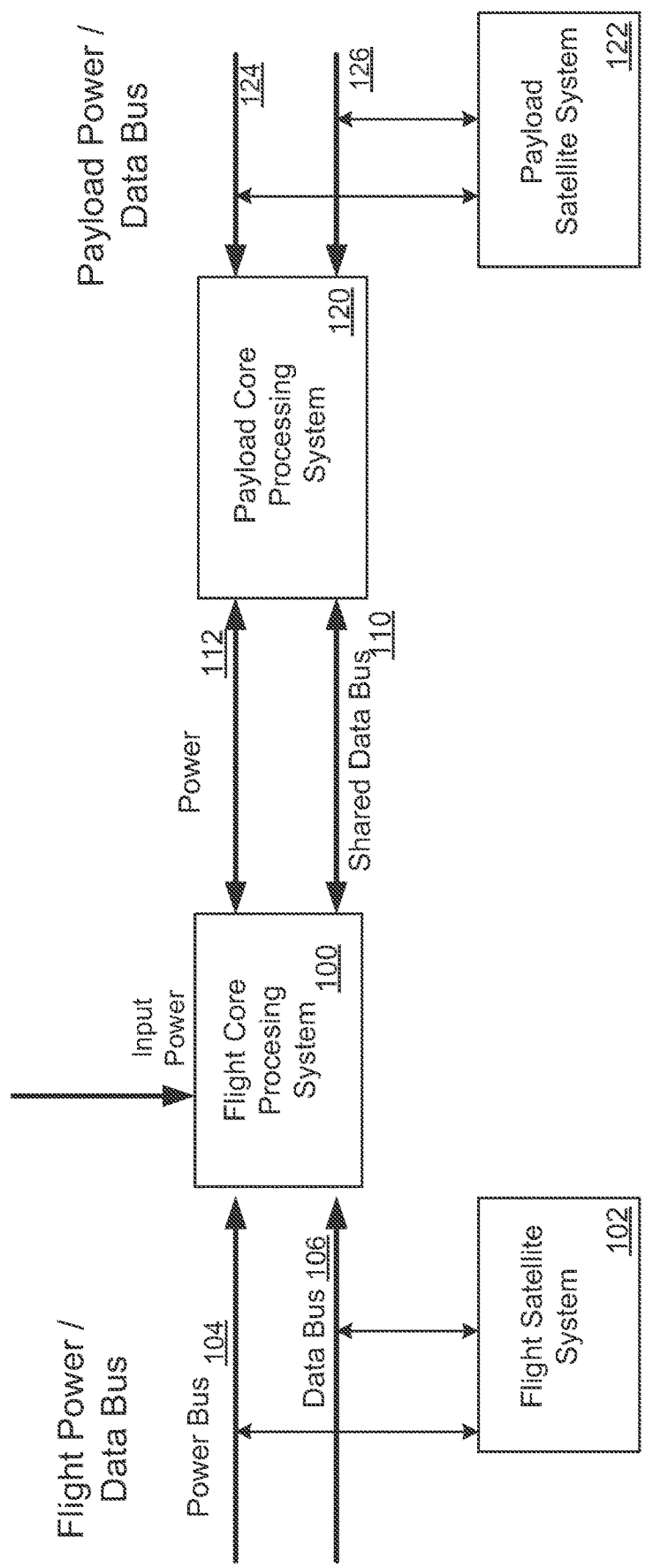
FIG. 1 illustrates a block diagram of an example distributed system architecture for an unmanned aerial vehicle (UAV).

This specification describes an example distributed system architecture for vehicles, such as unmanned vehicles. The unmanned vehicles may include unmanned aerial vehicles (UAVs), such as drones, unpiloted aerial vehicles, remotely piloted aircraft, unmanned aircraft systems, any aircraft covered under Circular 328 AN/190 classified by the International Civil Aviation Organization, and so on. The example distributed system architecture may include a flight core processing system (e.g., a system in communication with flight critical systems and processes) in communication with (e.g., via one or more data buses and/or one or more power buses) a payload core processing system, e.g., a system in communication with one or more payload systems and processes). As described in FIG. 1, the example flight core processing system maintains power and/or bandwidth requirements of flight critical systems. Additionally, the example payload core processing system manages power and/or bandwidth requirements of non-flight critical payload systems (e.g., sensors, cameras, gimbal systems). For example, a flight critical system or process may include an aerial vehicle part, assembly, installation, or process containing a critical characteristic whose failure, malfunction, or absence could cause a catastrophic failure resulting in engine shut-down or loss or serious damage to the aerial vehicle resulting in an unsafe condition.

To ensure that power and/or bandwidth requirements of payload systems do not overwhelm, or negatively affect, the flight critical systems, the flight core processing system can switch off power and/or bandwidth to the payload core processing system, or limit the power and/or bandwidth available to the payload systems in communication with the payload core processing system. Similarly, the payload core processing system can limit the power and/or bandwidth available to the payload systems by instructing the payload systems to enter lower power non-operational states. This distributed, e.g., separated, architecture allows for a UAV to have its flight-critical systems in flight ready condition with respect to power and/or bandwidth regardless of the number of payload systems that are included in the UAV.

For instance, in conventional systems, a malfunctioning payload system can draw too much power, or consume too much of the data buses bandwidth, such that the flight critical systems can malfunction. By separating control and management of power and bandwidth between flight critical systems and payload systems, the distributed system architecture can reduce, or limit, the occurrence of flight critical system failures.

Since the payload systems can be managed distinct from the flight critical systems, optionally the UAV can have payload systems replaced, modified, or removed, without the need for validation, verification, or re-certification of flight-critical systems.

Additionally, as will be described below, power usage and/or bandwidth usage of payload systems can be modified depending on a UAV's flight phase, e.g., taxiing, launching, in-air flight, landing, and so on. For instance, while the UAV is on the ground, e.g., taxiing, the flight core processing system can provide information to the payload core processing system to provide full power requirements, and/or bandwidth requirements, to each payload system. However, during in-air flight, particular payload systems can be accorded full power and bandwidth, with superfluous payload systems (e.g., those that are currently not being actively used) accorded minimal bandwidth, and limited power. In this way, the distributed system architecture can guard against power and/or bandwidth requirements, or anomalies, of a payload system negatively affecting flight critical systems.

FIG. 1 illustrates a block diagram of an example distributed system architecture 10 for an unmanned aerial vehicle (UAV). The distributed system architecture 10 includes a flight core processing system 100, e.g., a system in communication with flight modules 102 (e.g., a flight satellite system) which are critical to the safe operation of the UAV, connected to a payload core processing system 120, e.g., a system in communication with payload modules 122 (e.g., a payload satellite system) which are not critical to the safe operation of the UAV. In the illustrated example, the connection includes a shared data bus 110 connection (e.g., a bus that can transmit data, messages, packets), and a power bus connection (e.g., a bus which provides power). In this specification, a flight module is any system, module, or software process, that is critical to the safe flight operation of the UAV.

In the illustrated example, the flight core processing system 100 is configured as a central system hub for power and data, maintaining flight-critical systems and processes. For instance, the flight core processing system 100 can ensure functional operation of the one or more flight modules 102, e.g., some or all of the following: a global positioning system (GPS), other navigation sensors, a radio system, steering actuators, and so on. To ensure their functional operation, the flight core processing system 100 can eliminate power to the payload core processing system 120, e.g., over the power bus 112, and disable the flight core processing system's 120 connection to the shared data bus 110. In this way, the flight core processing system 100 can ensure that the flight modules 102 are provided with sufficient power and bandwidth for their safe operation.

For instance, upon determining that a payload module 122 is using too much current, e.g., due to a short circuit, the flight core processing system 100 can switch power 112 off to the payload core processing system 120. Similarly, upon determining that a payload module 122 is using too much bandwidth, the flight core processing system 100 can disable the payload core processing system's 100 connection to the data bus 110. In this way the flight core processing system 100 can ensure that flight modules 102 are not affected by malfunctioning payload modules 122, or over-use of power and/or bandwidth. By way of further example, upon determining that a flight critical system needs more power than currently available, the flight core processing system can instruct the payload core processing system to reduce the power provided to one or more payload systems, such as by placing them in a lower power standby mode (which may result in a reduction in the performance and/or functionality of one or more payload systems), to thereby make more power available to the flight critical system. Similarly, upon determining that a flight critical system needs more data bandwidth than currently available, the flight core processing system can instruct the payload core processing system to reduce the data bandwidth utilized by one or more payload systems, such as by instructing the one or more payload systems not to access a data bus for a specified period of time or with a lower frequency, to thereby make more data bandwidth on the data bus available to the flight critical system.

The flight core processing system 100 can dynamically determine power and bandwidth requirements of the flight modules 102, and provide information to the payload core processing system 120 identifying allowable power and bandwidth usage by payload modules 122.

The payload core processing system 120 can then enforce the allowable power and bandwidth usage by providing information to payload modules 122 instructing the modules 122 to enter different power states, e.g., low-power states, based off current power usage by the payload modules 122.

Additionally, optionally the flight core processing system 100 can obtain a current flight phase of the UAV, and provide information identifying the flight phase to the payload core processing system 120. The payload core processing system can then obtain information associated with the flight phase, e.g., payload modules 122 that can be placed into a nominal power state to function normally and payload modules 122 that are to be placed in a low-power state with reduced functionality.

Optionally, a given payload module 122 can also provide a request to the payload core processing system 120 to utilize bandwidth and/or power (e.g., a specified amount of bandwidth and/or power), which the payload module 122 can grant, or deny, based on, at least partly on, current flight phase or the acceptable power and/or bandwidth usage determined by the flight core processing system 100.

In this way, the flight core processing system 100 and payload core processing system 120 can be complementary, with the payload core processing system 120 providing insights into the power and bandwidth associated with payload modules 122, and the flight core processing system 100 providing insights into flight critical systems 102. Thus, the bandwidth and power usage of the payload modules 122 can be efficiently optimized to keep the flight critical modules 102 operating in a safe condition, e.g., with sufficient power and bandwidth usage, while disabling payload modules 122 when they are not needed to conserve battery life.

Figure 2:
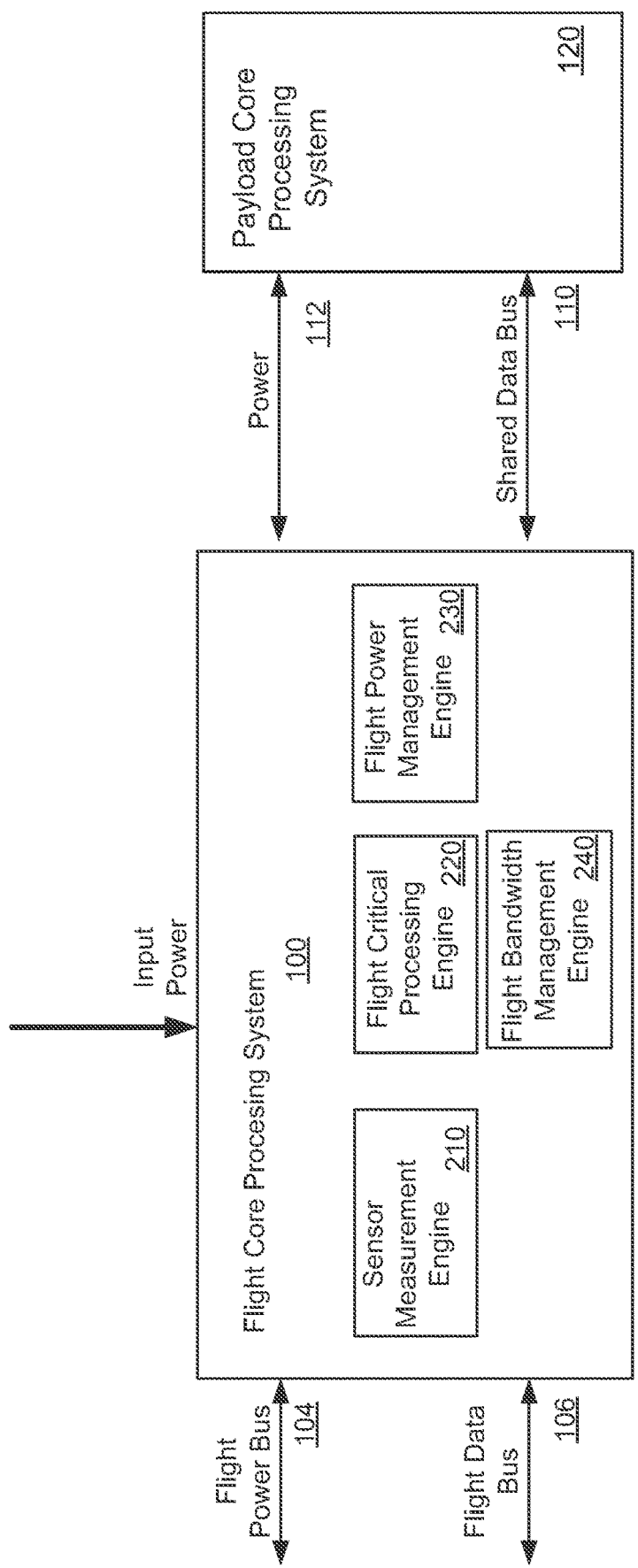
FIG. 2 illustrates a block diagram of an example flight core processing system.

FIG. 2 illustrates a block diagram of the example flight core processing system 100. The flight core processing system 100 can be a system of one or more processors, logic circuits, analog circuits, associated volatile and/or non-volatile memory, associated input/output data ports, power ports, etc., and/or one or more software processes executing on one or more processors or computers.

The flight core processing system 100 is connected to one or more flight modules 102 via a flight power bus 104 and a flight data bus 106. The flight data bus 106 can include one or more data buses of various types, e.g., ETHERNET, UNIVERSAL SERIAL BUS (USB), UAVCAN, IEEE 1394b, MIL-STD-1553, and so on. Optionally some or all of the flight modules 102 can be connected in series, e.g., daisy-chained together, with one flight module ultimately connected to the flight core processing system 100. Optionally, two or more flight modules 102 can be connected to the flight core processing system 100, and other flight modules can be connected in series, e.g., daisy-chained, to one of the two or more flight modules 102. The flight core processing system 100 receives power, e.g., to power the flight power bus 104, from an input power source, e.g., one or more batteries included in a UAV, or a power system that maintains one or more batteries.

The example flight core processing system 100 includes a flight critical processing engine 220 that can perform flight critical tasks, including one or more of baro-inertial measurements, inertial estimation and navigation, autonomous flight control, e.g., autopilot, and flight plan execution contingency identification and contingency flight plan execution, enumeration and management of flight modules 102, in-system programming of flight modules 102 and the flight core processing system 100 itself, and/or recording and storing data logs. Data logs can include sensor data, navigation data, flight plans, system status information, system error information, contingency state information, and/or UAV system configuration data. Thus, the flight core processing system 100 may be coupled to one or more sensors included in the UAV, such as accelerometers, barometric sensors, gyro sensors, temperature sensors, battery and/or current sensors, battery and/or other voltage sensors, flight surface position sensors, motor sensors, and/or other sensors.

Additionally, the flight critical processing engine 220 can receive information, e.g., from a user operating a configuration utility, configuring an autopilot, flight modules 102, and so on. The flight critical processing engine 220 can then provide the configuration information to respective flight modules 102 or other components of the UAV. The configuration utility is described below, with reference to FIG. 7.

The flight core processing system 100 includes a sensor measurement engine 210, which can be in communication with one or more of the sensors disclosed herein. For example, the sensor measurement engine 210 may be in communication with an inertial measurement unit (IMU) including, for example, a MEMS (Micro-electromechanical system) 3-axis accelerometer sensor and MEMS 3-axis rate gyro sensor, and/or other type of accelerometer and gyro sensors. An optional barometric pressure sensor can also be included to measure barometric atmospheric pressure and one or more temperature sensors may be included to measure environmental temperature (e.g., air temperature) and/or the temperature of various modules and/or components (e.g., such as modules and/or components disclosed herein). Inertial and barometric sensors may be utilized by the sensor measurement engine 210 to correct for environmental conditions (such as temperature) by a applying a pre-determined calibration correction. The sensor measurement engine 210 can execute an inertial estimation algorithm, e.g., a Kalman Filter or Extended Kalman Filter, which can estimate position, velocity, and/or attitude of the UAV using the inertial measurement unit and/or optional barometric pressure sensor.

Additionally, the sensor measurement engine 210 can obtain thermal measurements of the UAV, and obtain battery levels, e.g., voltage level, charge level, of one or more batteries powering the UAV. As will be described below, optionally if the thermal measurements exceed a threshold, or the battery levels are less than a threshold, the flight core processing system 100 can disable power usage by the non-flight critical payload modules.

The flight core processing system 100 includes a flight power management engine 230 which can adjust power to the payload core processing system 120, to ensure that any flight critical modules 102 receive full power requirements. The flight power management engine 230 is configured to dynamically negotiate power usage and requirements with the payload core processing system 230, and also to sever the power connection to the payload core processing system 120 upon determining the payload core processing system 120, or a payload module 122, is malfunctioning. Furthermore, the flight power management engine 230 can regulate the voltage level of power 112 provided to the payload core processing system 120, condition the power 112 to suppress or remove transient voltage anomalies, and measure power current power and current usage of the payload core processing system 120.

The flight power management engine 230 can disable power to the payload core processing system 120 upon determining that the power usage of the payload core processing system 120 endangers the safe flight operation of the UAV. For instance, the flight power management engine 230 can obtain information identifying that a battery level of the UAV, e.g., a level of one or more batteries powering the UAV, is below a threshold. Optionally, the threshold can be determined dynamically, e.g., based on a remaining flight time and power requirements of the flight modules 102. Optionally, a given threshold may be pre-specified, but may optionally be dynamically modified based at least in part on current flight related parameters (e.g., one or more of: remaining flight time, battery charge remaining, air temperature, other sensor measurements, payload sensor readings that still need to be taken, power requirements of the flight modules 102, etc.)

Additionally, the power management engine 230 can disable power to the payload core processing system 120 upon determining that the payload core processing system 120 is consuming too much power or battery charge, e.g., a payload module is malfunctioning causing a short-circuit or over-current condition.

Similarly, the power management engine 230 can disable power to the payload core processing system 120 upon determining that one or more thermal states of the UAV, e.g., system temperature of the batteries, processing systems, modules 102 and 122, and so on, exceed a threshold. In this way, the flight power management engine 230 can prevent damage to the UAV's electrical systems, e.g., flight critical modules 102.

In some implementations, instead of disabling power to the payload core processing system 120, the flight power management engine 230 can provide information identifying a reduced acceptable power usage to the payload core processing system 120. For instance, if the flight power management engine 230 determines that one or more thermal states exceed a threshold, the flight power management engine 230 can reduce the acceptable power usage of the payload modules until the thermal states normalize.

To dynamically negotiate power usage, the flight power management engine 230 can communicate with the flight modules 102, and the payload core processing system 120. The communications can include, the flight core processing system 100 receiving electrical power requirements for flight modules 102 and payload modules 122, e.g., minimum electrical power, nominal electrical power, maximum electrical power, electrical power requirements of one or more states of each module, etc. In this way, the flight core processing system 100 can identify power requirements of some or all of the connected modules 102 and 122.

The payload core processing system 120 can provide requests to increase its acceptable power usage, e.g., the system 120 can receive requests from payload modules 122 to be placed in a full power state. The flight power management engine 230 can determine whether the request can be safely granted, e.g., based off power requirements of flight critical modules 102.

The flight power management engine 230 can also provide information to flight modules 102 to place them in a low power state, e.g., depending on the current flight information. For instance, one or more flight critical modules 102 might be required for the safe take-off or safe landing of the UAV, but not for safe operation in an on-station flight phase, e.g., a phase during which the UAV remains in a particular flight path. Therefore, the flight power management engine 230 can safely place the unneeded flight modules 102 in a low power state, and provide information to the payload core processing system 120 identifying a greater acceptable power usage.

Similarly, power states of payload modules 122 can be modified according to a current flight information of the UAV, e.g., flight phase, contingency state, and so on. In some implementations, the flight power management engine 230 can obtain the current flight phase, e.g., from the flight-critical processing engine 220, and provide the current flight phase to the payload core processing system 120. As will be described below with reference to FIG. 3, the payload core processing system 120 can then modify the power states of connected payload modules 122 according to the flight phase.

Similar to negotiating power requirements of the payload core processing system 120, the flight core processing system 100 can negotiate bandwidth requirements of the payload core processing system 120. In this specification, bandwidth requirements include the use of the data bus 110 for a period of time or over a period of time, and can include providing data messages, packets, and so on, to the shared data bus 110 for receipt by another module or processing system. For instance, a camera payload module can provide a large amount of data on the shared data bus 110 to be provided to a radio module for transmission to a remote radio destination, such as a ground station or other aerial or ground vehicle.

The flight core processing system 100 includes a flight bandwidth management engine 240 that can restrict the payload core processing system's 120 use of the shared data bus 110. Additionally, the flight bandwidth management engine 240 can prioritize use of the shared data bus 110 by flight modules 102, e.g., at the expense of non-flight critical payload modules 122.

The flight bandwidth management engine 240 can prioritize, restrict, throttle (e.g., reduce the accessible bandwidth to a certain number of bytes per second), increase latency, or prevent delivery of, data messages emanating from particular payload modules 122. As will be described below with reference to FIG. 5, the flight bandwidth management engine 240 can enforce bandwidth restrictions depending on flight status (e.g., particular payload modules 122 can be blocked when they are not needed), flight phase (e.g., payload modules 122 can be blocked from use of the data bus 110 during a take-off phase), contingency state of the UAV (e.g., payload modules 122 that desire to transmit data through a radio can be blocked from use of the data bus 110 during a "Lost GPS" contingency state, in an effort to reduce radio frequency transmission interference so that a GPS signal lock can be obtained), and so on.

In addition to blocking use of the shared data bus 110, the flight bandwidth management engine 240 can prioritize, restrict, throttle, increase latency, or prevent the delivery of all data messages, or a particular type of data message, being sent to or from a particular software process. Additionally, the flight bandwidth management engine 240 can prioritize, restrict, throttle, increase latency, or prevent the delivery of data messages being sent to or from a specific class of module, e.g., all flight critical modules or payload modules. The flight bandwidth management engine 240 can prioritize, restrict, throttle, increase latency, or prevent all messages, or a specific type of data message, from being transmitted over the shared data bus 110 until the flight bandwidth management engine 240 halts such prioritization, restriction, throttling, increase in latency, or prevention or for a specified period of time.

Figure 3:
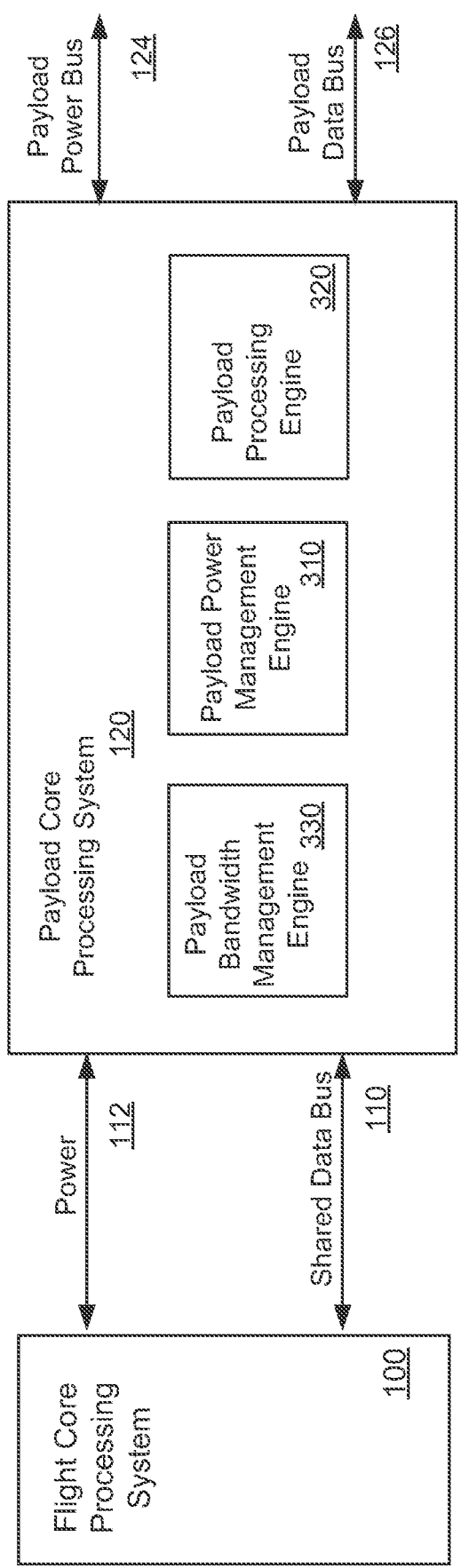
FIG. 3 illustrates a block diagram of an example payload core processing system.

FIG. 3 illustrates a block diagram of the example payload core processing system 120. The payload core processing system 120 can be a system of one or more processors, logic circuits, analog circuits, associated volatile and/or non-volatile memory, associated input/output data ports, power ports, etc., and/or one or more software processes executing on one or more processors or computers. The payload core processing system 120 receives power 112 from the flight core processing system 100, and can communicate with the flight core processing system 100 via a shared data bus 110.

As described in FIG. 1, the payload core processing system 120 controls a payload power bus 124, e.g., one or more power buses with different power/voltage characteristics, and a payload data bus 126, e.g., one or more types of data buses such as ETHERNET and UNIVERSAL SERIAL BUS, UAVCAN, IEEE 1394b, MIL-STD-1553, etc., which one or more payload modules 122 are connected to. Since each payload module 122 can require a particular power characteristic, e.g., operational voltage level, and particular data bus connection to be functional, the payload core processing system 120 includes disparate types of power buses 124 and payload buses 126.

The payload core processing system 120 includes a payload processing engine 320 which can perform enumeration, configuration, and in-system programming of connected payload modules 122, e.g., via the payload data bus 126. The payload processing engine 320 can determine, at least in part, when payload modules 122 can be programmed based on several factors, including flight state (e.g., In-Air, On-Ground, Active, Inactive), system error conditions, hardware compatibility of payload modules 122 being programmed, firmware image validity, firmware image signature mismatch, and software license validity. For example, the payload processing engine 320 can prevent in-system programming to occur on selected payload modules 122 while the UAV is in-flight. In some implementations, the payload processing engine 320 can communicate with a configuration utility, e.g., operated by a user, which can provide configuration and programming information to the payload modules 122. The configuration utility is described below, with reference to FIG. 7.

The payload core processing system 120 includes a payload power management engine 310 which can place one or more of the modules 122 in distinct power states, e.g., low-power, nominal power, high-power, and negotiate power usage by the payload modules 122 with the flight core processing system 100.

The payload core processing system 120 can receive information, e.g., from the flight core processing system 100, identifying a current flight phase of the UAV. In response to this received information, the payload power management engine 310 can obtain information identifying payload modules 122 and associated acceptable power states for the received flight phase. The payload power management engine 310 can then provide requests, e.g., over the payload data bus 126, to the payload modules 122 for the payload modules 122 to be placed in the acceptable power states. For instance, if the flight-phase is on-station, e.g., a flight phase during which the UAV stays in a same area or performs a same flight pattern, the payload power management engine 310 can obtain information identifying power states of payload modules 122 for the on-station phase. This can include all, or specific, payload modules 122 being allowed to operate in full-power states.

Additionally, the payload power management engine 310 can receive, e.g., from the flight core processing system 100, information identifying an acceptable power usage by the payload core processing system 120. The payload power management engine 310 can determine the current power and/or current usage, e.g., on the payload power bus 124, and modify power states of particular payload modules 122 to bring the usage of the power bus 124 in conformance with the received acceptable power usage.

The payload power management engine 310 can receive requests from payload modules 122 to be placed in a higher power state, and determine whether the higher power state would cause the power bus 124 to be using more power than is allotted it by the flight core processing system 100. Upon a positive determination, the payload power management engine 310 can deny the request, or place a different payload module 122 in a low power mode, and grant the request. In some implementations, each payload module 122 can be allotted a particular amount of time in which it operates in a full power state, or the payload modules 122 can be associated with a hierarchy. The payload power management engine 310 can prefer to place payload modules 122 in a full power state based on each module's 122 location in the hierarchy. In this way, the payload power management engine 310 can operate within safe acceptable power usage guidelines set by the flight core processing system 100.

Additionally, the payload power management engine 310 can determine that a particular payload module 122 is malfunctioning, e.g., consuming too much power or current, and provide a request to the payload module 122 to turn-off. If the malfunctioning payload module 122 is unable to process the request, the payload power management engine 310 can shut off power to the payload power bus 124. Alternatively, the payload power management engine 310 can provide information to the flight core processing system 100 identifying that the system 100 should sever power connection 112 entirely to the payload core processing system 120.

The payload management engine 310 can also store information identifying a history of electrical faults of particular payload modules 122, e.g., short-circuit or over-current conditions. Upon determining that a payload module 122 has experienced an electrical fault greater than a pre-specified or dynamically determined threshold, e.g., 2 times, 3 times, 5 times, the payload power management engine 310 can provide a request for the particular payload module 122 to turn off.

The payload core processing system 120 further includes a payload bandwidth management engine 330 which can negotiate bandwidth requirements, e.g., use of the shared data bus 110, of the payload modules 122. For instance, a camera payload module 122 can provide a large amount of data, e.g., data messages or packets, on the shared data bus 110, e.g., one or more images or video streams. The payload bandwidth management engine 330 can ensure that this large amount of data is only placed on the shared data bus 110 at times when it will not affect the safe operation of flight-critical modules. Additionally, a malfunctioning payload module 122 might block use of the shared data bus 110. The payload bandwidth management engine 330 can block use of the shared data bus by the malfunctioning payload module 122. The payload bandwidth management engine 330 may specify that a given payload module 122 may only communicate a specified maximum amount of data over a specified time period (e.g., a specified data rate of transmission). Thus, for example, the camera payload module 122 may be instructed to slowly transmit photographs over the shared data bus 110 (e.g., a specified maximum number of megabytes per second, or other amount of data over other period of time), rather than attempt to transmit photographs over the shared data bus 110 in a burst or at a faster rate.

The payload bandwidth management engine 330 receives information, e.g., from the flight core processing engine 100, identifying that the payload bandwidth management engine 330 is to throttle, increase latency, restrict, use of the shared data bus 110. For instance, the payload bandwidth management engine 330 can receive information identifying a particular flight phase, e.g., in-flight, and throttle, increase latency, or restrict, use of the shared data bus 110 by particular payload modules 122 that are not needed during the particular flight-phase. Similarly, during an on-station flight phase, the payload bandwidth management engine 330 can allow full use of the shared data bus 110 by payload modules 122. The payload bandwidth management engine 330 can also prevent delivery of data messages provided from particular payload modules 122. For instance, data messages directed to the flight core processing system 100 from a payload module 122 can overwhelm the flight core processing system 100, e.g., causing a denial of service. The payload bandwidth management engine 330 can cause these data messages to not be delivered.

Figure 4:
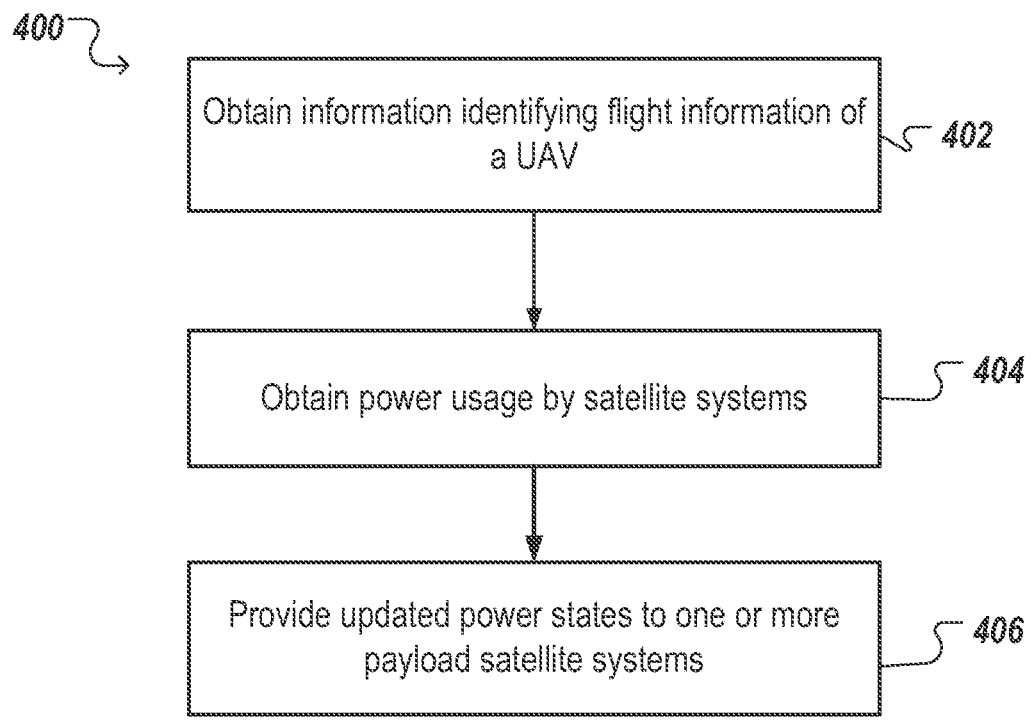
FIG. 4 is a flowchart of an example process for dynamically negotiating power requirements of modules based on flight information of a UAV.

FIG. 4 is a flowchart of an example process 400 for dynamically negotiating power requirements of modules based at least in part on flight information of a UAV. For convenience, the process 400 will be described as being performed by a system of one or more processors, e.g., the distributed system architecture 10.

The system obtains information identifying flight information of the UAV (block 402). Flight information can include an identification of the phase in a flight progression (e.g., on-station, taxiing, launch phase, landing phase), a contingency state of the UAV if it encounters an error (e.g., low fuel, lost GPS, lost radio link), or a status of the UAV (e.g., on-ground, in-configuration, in-flight).

As the flight of the UAV progresses from, for example, a taxiing on-ground flight phase, to an on-station flight phase, to a landing flight phase, the UAV can store information identifying the progression. The system can then obtain the information, and determine the present flight phase. The system can obtain the current flight phase, for example, in response to a change in the progression of flight phase of the UAV. Similarly, the system can determine a contingency state of the UAV by identifying a system warning or error related to a flight critical system or module e.g., based on one or more data messages and/or sensor readings.

The system obtains power usage by modules (block 404). The system obtains current power usage of flight critical modules, and payload modules. For instance, the system can determine the total output power of connected flight critical modules, e.g., the flight core processing system 100 can determine the total output power, and also determine the total output power of payload modules, e.g., the payload core processing system 120 can determine the total output power.

The system provides updated power states to one or more of the payload modules (block 406). The system modifies the power states of one or more of the modules based off the flight information. Optionally, the system can store information identifying acceptable power states of modules with regards to flight information.

For example, the system can obtain information identifying that during an "on-station" flight phase, all of the payload modules are to be accorded nominal power states so that they can function normally. However, during a "landing", "returning to base", "climbing", "descending", and so on, flight phase, the system can provide information to one or more payload modules to enter a low power or power-off state as they are not needed.

In another example, the system can obtain information identifying that during a "Lost GPS" contingency state, the system is to place payload modules that can interfere with obtaining a lock on a GPS signal in a low-power or power-off non-functional state to prevent or reduce such interference.

Optionally, the system can obtain information identifying an acceptable power usage by payload modules. The acceptable power usage can depend at least in part on flight information, and can, for example, be greater during an "on-station" flight phase, or an "in-configuration" status, e.g., a status identifying that each payload module is to be in nominal power state to receive configuration information. The system can then provide information to one or more payload modules to enter a nominal power state, and thus to consume power. Providing information can include, receiving a request from one or more payload modules to enter nominal power states, and providing a response granting the requests, or providing a direct request for one or more payload modules to enter nominal power states.

If the system determines that the acceptable power usage does not allow for all payload modules to enter a nominal power state, it can identify particular payload modules that can enter normal operation. In some implementations, as described above, the system can store information identifying allowed payload modules for particular flight information. In some other implementations, the system can store a hierarchy of payload modules, and configure one or more payload modules for normal operation based off their hierarchy that consume less than or equal to the acceptable power usage.

Figure 5:
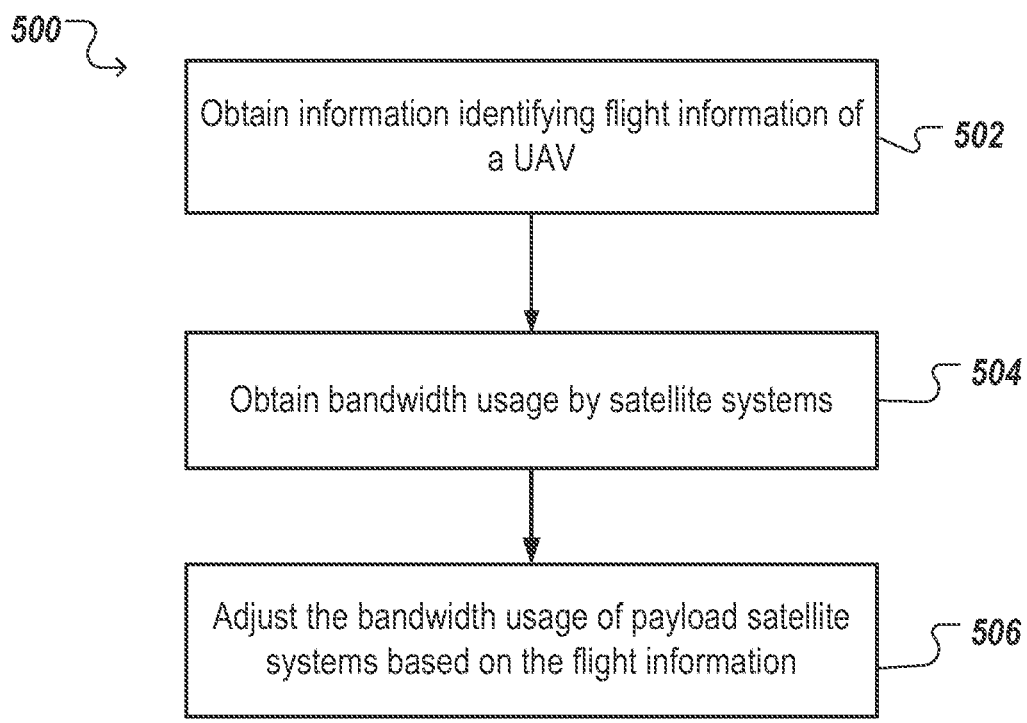
FIG. 5 is a flowchart of an example process for dynamically negotiating power requirements of modules based on flight information of a UAV.

FIG. 5 is a flowchart of an example process 500 for dynamically negotiating power requirements of modules based at least in part on flight information of a UAV. For convenience, the process 500 will be described as being performed by a system of one or more processors, e.g., the distributed system architecture 10.

The system obtains information identifying flight information of the UAV (block 502). An example process of obtaining flight information is described above, with reference to FIG. 4.

The system obtains bandwidth usage by modules (block 504). The system determines a bandwidth usage of the flight critical modules and the payload modules. Since many of the flight critical systems need sufficient bandwidth to remain functional, the system determines a measure of central tendency of bandwidth (e.g., mean, median, mode, geometric mean, harmonic mean, weighted mean, truncated mean, midrange mean, trimean, winsorized mean, etc.) use by the flight critical modules, and additionally peak bandwidth usage by the flight critical modules.

The system adjusts the bandwidth usage of payload modules based on the obtained flight information (block 506). The system can restrict, throttle, increase latency, or prevent the delivery of data messages being sent to or from payload modules based on the flight information. That is, the system can provide information to specific payload modules identifying that they are not to place any data messages on, or consume bandwidth of, the data bus, e.g., the shared data bus 110. The system can also receive data messages placed on the data bus by one or more payload modules and cause the messages to not be delivered to their intended target or not to be delivered for a certain period of time (thereby increasing latency). In some implementations, the system can store data messages provided by payload modules in a data structure, e.g., a queue, and provide the data messages to their intended targets upon the occurrence of a different flight phase, e.g., a camera taking pictures during landing can provide its images after the plane lands.

Additionally, the system can prioritize data messages from flight modules, e.g., at the expense of data messages from payload modules. Prioritization can include the system processing, or providing, the data messages prior to non-prioritized data messages emanating from remaining modules.

To adjust the bandwidth, the system can obtain information identifying acceptable bandwidth usage of payload systems given the obtained flight information. For instance, the system may restrict data messages from being placed on a data bus, or prevent delivery of the messages, emanating from superfluous payload modules that are not currently needed during an "in-flight" flight phase, but allow full message delivery during an "in-configuration" UAV status. Similarly, the system can restrict or throttle data message delivery of payload modules during a "launch" flight phase, but grant all bandwidth requests, e.g., not restrict or throttle data messages, during an "on-station" flight phase.

The system determines the acceptable bandwidth usage, in part, with the bandwidth usage of the flight modules. Optionally, the system can ensure that the acceptable bandwidth usage by the payload modules does not interfere with the peak bandwidth usage of the flight critical modules. Optionally, the system can ensure that the acceptable bandwidth usage by the payload modules does not interfere with the average (or other central tendency) bandwidth usage of the flight critical modules.

Figure 6:
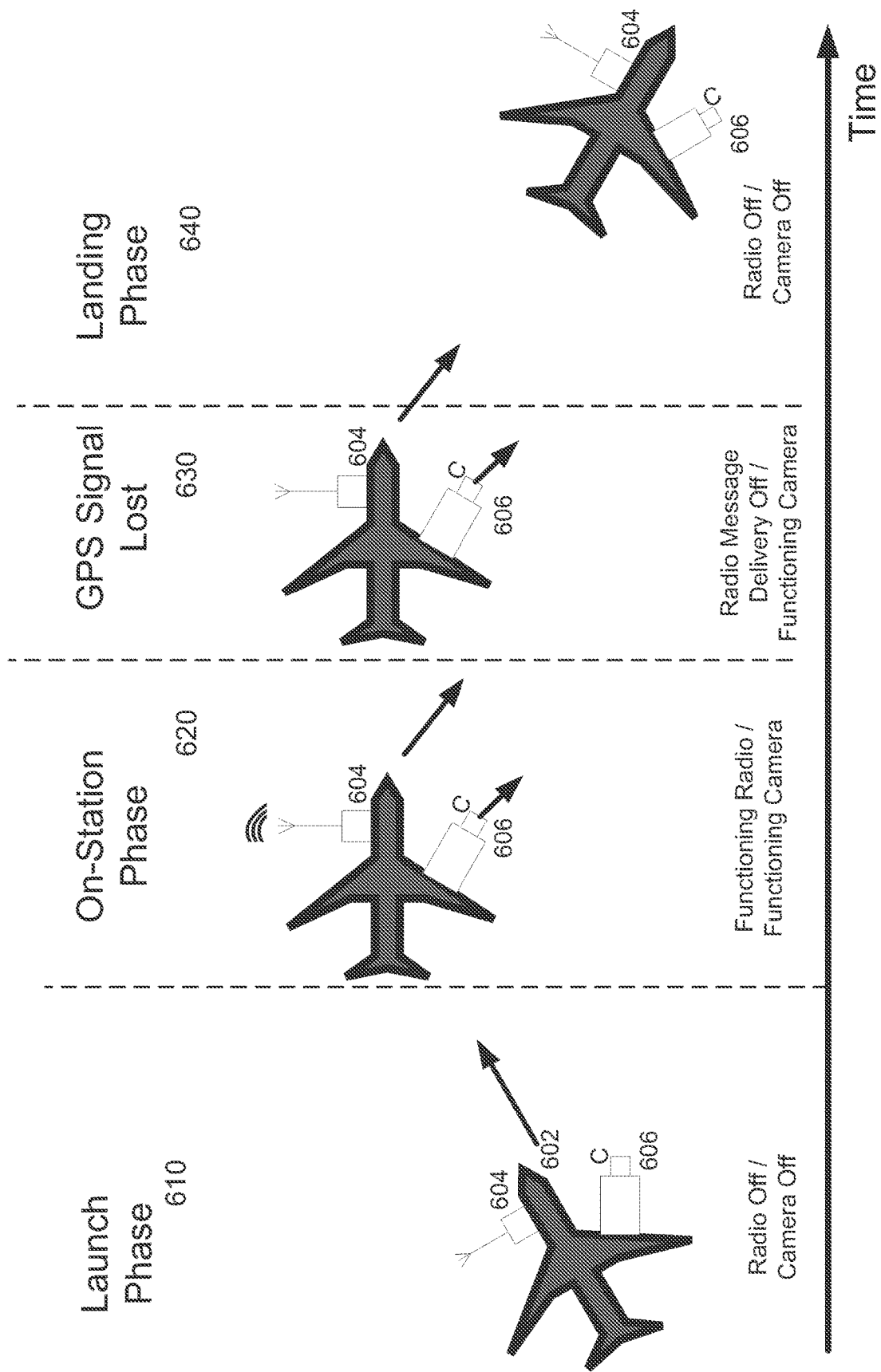
FIG. 6 is an illustration of a UAV entering different example flight phases.

FIG. 6 is an illustration of an example UAV entering and leaving different flight phases. The illustration includes an example UAV 602 in different phases of its flight progression. The UAV in this example includes two payload module, e.g., camera system 606, and radio system 604. The radio system 604 transmits, and receives, data and messages from the camera system 606 to, and from, communication systems outside of the UAV, e.g., ground based control systems.

The first flight phase 610, e.g., the launch phase, is illustrated as the UAV 602 launching into the air. A system, e.g., the distributed architecture system 10, can obtain information identifying flight information, e.g., a present flight phase. The system can then obtain information (e.g. from memory and/or by querying the payload modules) identifying payload modules and permitted power usage and bandwidth usage. In the example of FIG. 6, the system has determined that the two payload modules, e.g., the camera system 604 and radio system 606, should not be consuming power or using bandwidth during the first flight phase 610, instead devoting full power and bandwidth to flight critical systems.

After launching, the UAV enters an "on-station" flight phase 620. As illustrated, the system has obtained information identifying that during an on-station flight phase, the UAV is permitted full use of its payload modules. As similarly described with respect to FIGS. 4 and 5, the system provides information to the two payload modules identifying that they can enter a nominal power state, and utilize nominal bandwidth, to start properly functioning.

During the example on-station flight phase 620, the UAV has entered a contingency state identifying the GPS signal is lost 630, which in this example is a flight-critical system. To guard against interference, and ensure a speedy GPS signal recovery, the system has obtained information identifying that during the contingency state 630, the UAV is to disable data messages being provided to any payload radio systems, e.g., the radio system 604. This ensures that the radio system 604 does not transmit unnecessarily and create interference. Optionally, the camera system 606 can remain functioning, e.g., at a nominal power state, however the system will cause its bandwidth use to be partially eliminated, e.g., by causing delivery of its data messages to the radio system 604 to fail.

After regaining GPS signal, the UAV enters a "landing phase" flight phase 640. Similar to the launch phase 610, during a landing phase the system obtains information identifying that payload modules should enter low power states and not utilize bandwidth.

Configuration Utility

Figure 7:
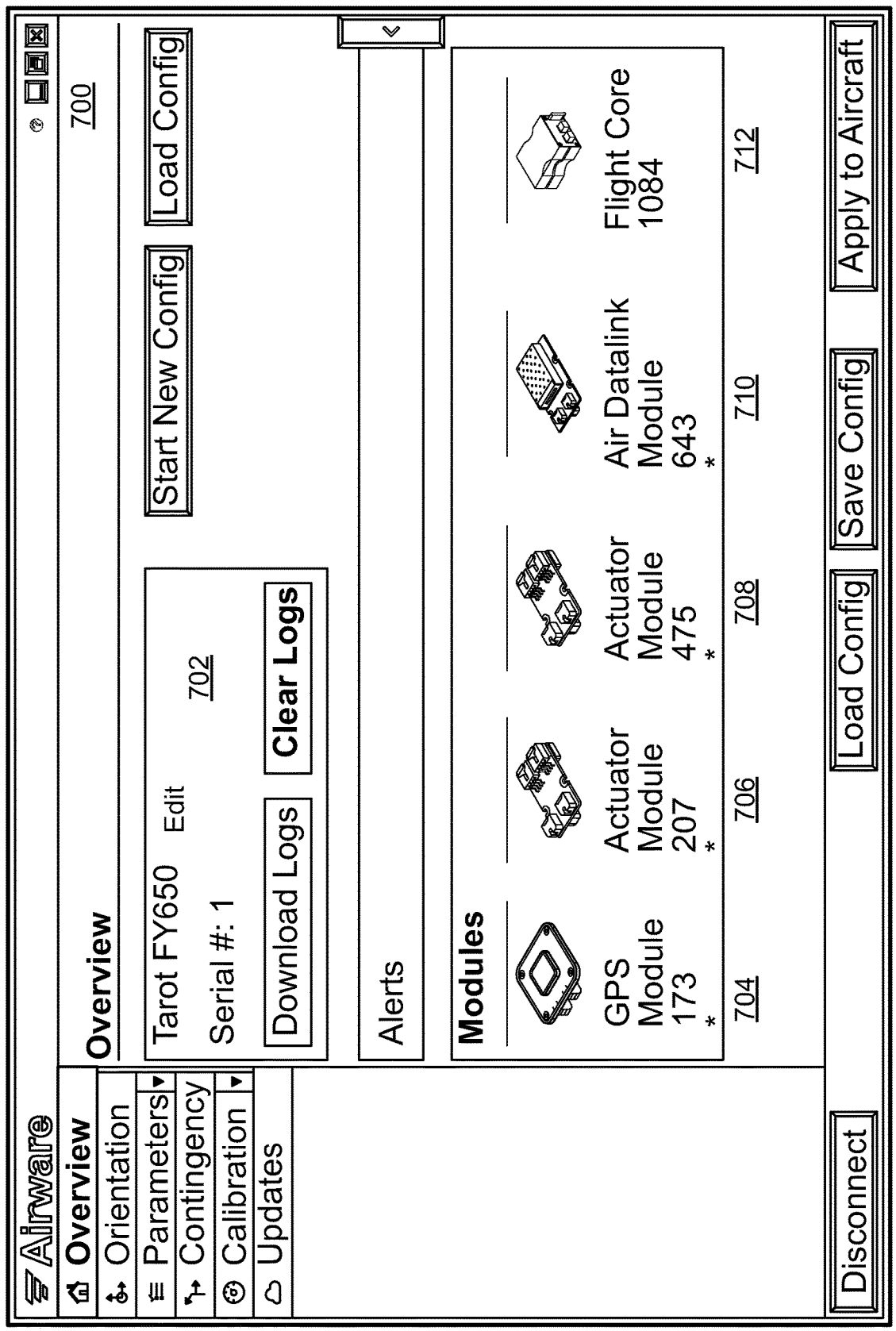
FIG. 7 is an illustration of an example user interface generated by a configuration utility.

FIG. 7 is an illustration of an example user interface generated by an example configuration utility 700. The configuration utility 700 is a tool for configuring a UAV (e.g., an autopilot, connected payload and flight modules), which can generate user interfaces and provide information for presentation to a user and which can receive information, menu selections, and instructions from the user. Optionally, the configuration utility 700 executes on a system separate from the UAV, which connects to the UAV, e.g., wirelessly or through a wired connection to the distributed system architecture 10, and provides capabilities to modify the UAV's configuration online (while connected) or offline (running independently of the autopilot or modules). Optionally, the configuration utility 700 can be run on the UAV, e.g., the distributed system architecture 10, which provides a user interface for presentation on a display connected to the UAV. During configuration, by the configuration utility 700, the UAV can be placed in an "in-configuration" status, which provides full power and bandwidth requirements to payload modules, e.g., described above.

The configuration utility 700 identifies the autopilot, payload and/or flight modules, and information describing each module, e.g., some or all of the following: SKU, model, serial number, current configuration, capabilities, power usage, data bandwidth usage, flight criticality (e.g., how critical the module is for flight safety), and/or other information.

In the example illustration of FIG. 7, the configuration utility 700 has identified a name and serial number 702 of the UAV, e.g., Tarot FY650 with serial #1." Additionally, the configuration utility 700 has identified five modules included in the UAV, including a GPS module 704, two Actuator modules 706 and 708, an Air Datalink module 710, and a flight core module 712.

The configuration utility 700 is configured to assist in configuring a UAV, including the UAV's autopilot, and flight/payload modules. The configuration utility 700 can validate configurations of a UAV to ensure correct functionality of the UAV during flight. Optionally, the configuration utility 700 can walk a user through the configuration process, e.g., providing one or more easy to use user interfaces described below.

In validating a configuration of a UAV, the configuration utility 700 can provide user interfaces to guide a user in enabling, and configuring, components of the UAV. For instance, the configuration utility 700 can configure an autopilot, such as controller setup, gain selection, and aircraft type selection. Additionally, the configuration utility 700 can configure an actuator module port configuration, actuator limit settings, actuator type and protocol settings, and so on (e.g., for a flight surface actuator, for a landing gear actuator, for a parachute actuator, etc.). Similarly, the configuration utility 700 can configure a GPS module, a magnetometer configuration (e.g., including hard-iron and soft-iron magnetic calibration), datalink module configuration (e.g., frequency/band settings, Internet Protocol settings, transmission power settings, net mask settings, mesh networking settings), and/or payload module configuration (e.g., gimbal camera control module calibration).

The configuration utility 700 can also provide feedback to the user/operator to make improvements or adjustments to a selected configuration, and optionally enforce certain restrictions to prevent invalid or dangerous configurations from being loaded onto a UAV.

Examples of specifying, examining, and validating configurations are provided below. Various user settings may be provided using menus (e.g., drop down menus, flyout menus, accordion menus or other menus, which may optionally present currently valid options), text fields, or otherwise.

Figure 8A:
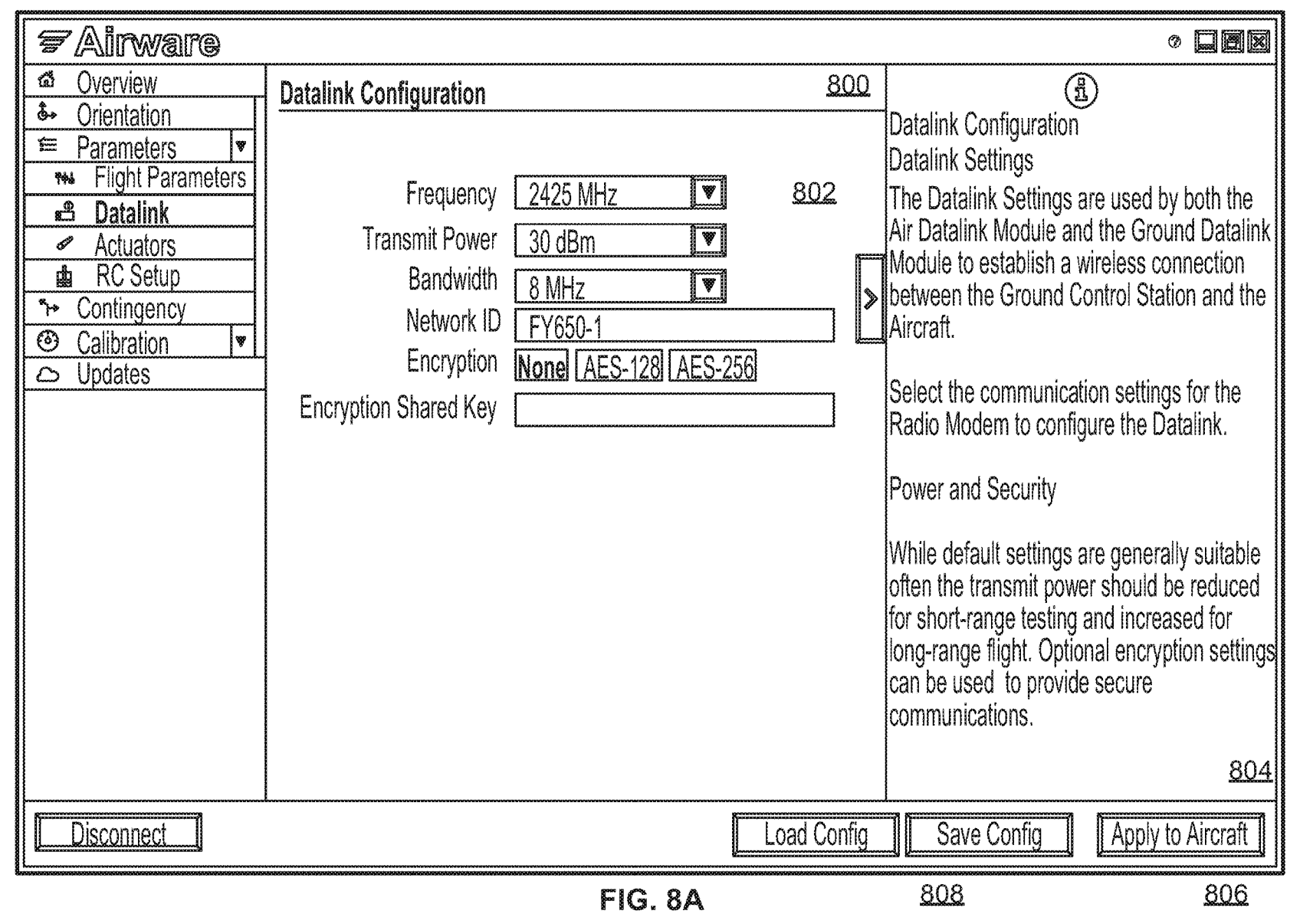

FIG. 8A illustrates a user interface 800 generated by the configuration utility for configuring and validating a UAV radio datalink, e.g., a flight critical datalink or a payload datalink. The user interface 800 includes selectable options 802, e.g., frequency selection, transmission power selection, and bandwidth selection, with each selectable option displaying options compatible with the specific manufacturer, model, and capabilities of the radio datalink. The configuration utility can store, or have access to, information describing UAV components, including in this example, a radio datalink.

Additionally, the configuration utility can ensure that a ground datalink includes complementary settings to the UAV radio datalink. That is, the configuration utility can connect to a ground based system, and present a user interface with selectable options already selected based on the UAV selections 802.

The user interface 800 includes an explanation of the datalink settings 804, including identifying that both the ground datalink and the UAV datalink will be automatically configured with the same settings. In this way a user of the user interface 800 can understand which options to select, and feel confident that the configuration utility will effect a functional UAV.

The user can select option 806, e.g., "Apply to Aircraft," to apply the selectable options 802 to the UAV datalink. After selection of the option 806, the datalink is placed in an "in-configuration" status, and the selected options 802 are provided to the datalink.

The user can also save the current configuration, or load a previous configuration 808 with an identifier (e.g., a configuration name, a unique alphanumeric code, etc.). A search interface may be provided enabling a user to submit a configuration search query to a configuration utility search engine. The configuration utility search engine may identify matching saved configuration files, and may present a listing of such matching configuration files to the user. The user can select a given configuration file from the listing, and the configuration utility may present the selected configuration file to the user via a corresponding configuration user interface. Optionally, the user may modify the selected configuration file and optionally save the modified configuration file with a different identifier.

Figure 8B:
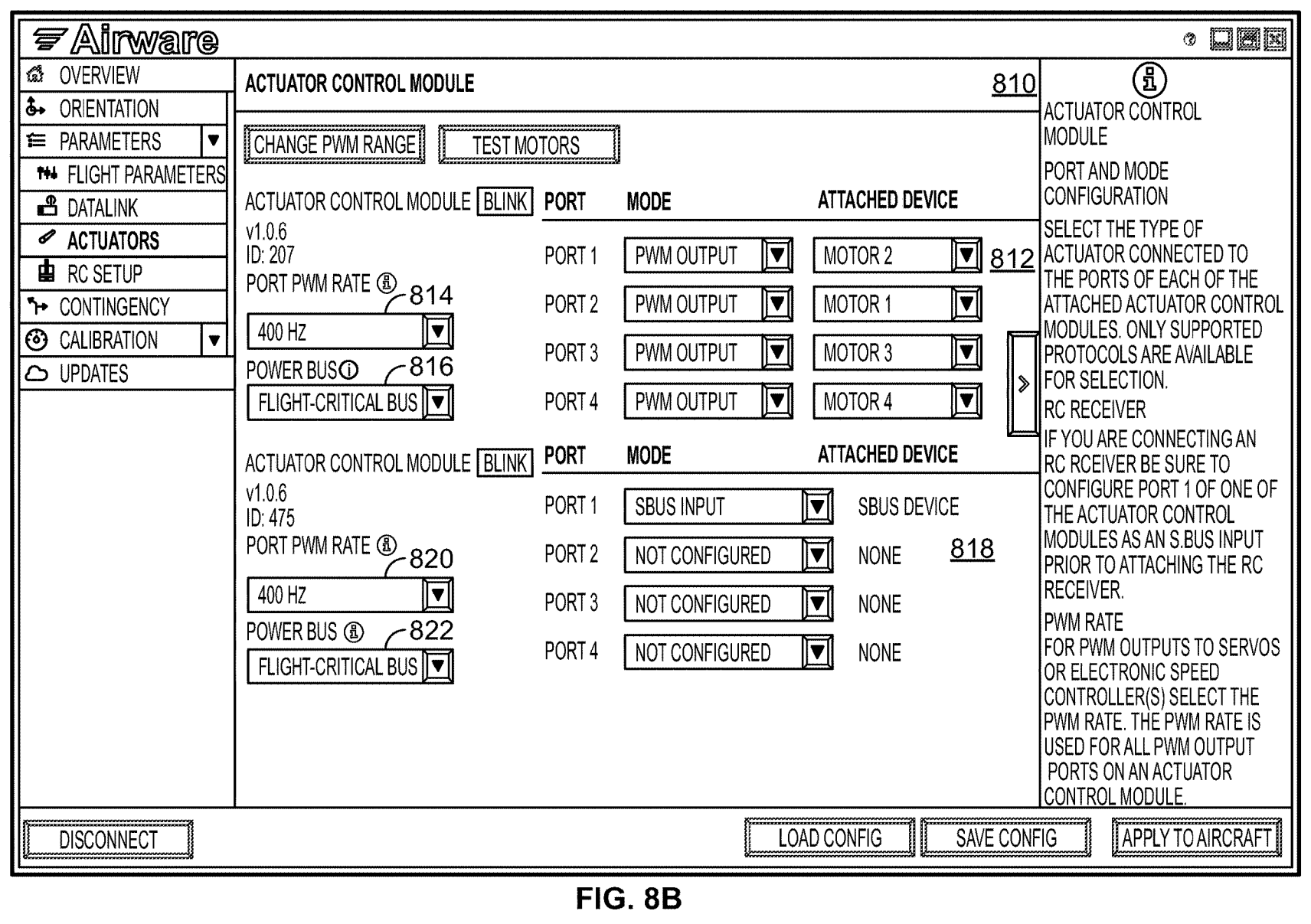

FIG. 8B illustrates a user interface 810 generated by the configuration utility for configuring and validating a UAV effector port mapping for one or more actuator control modules. As will be discussed, the user interface 810 accesses and displays determined information, such as what ports of a given actuator control module are connected, to what devices the actuator control module ports are connected to, to which inputs of the connected devices the actuator control module ports are connected to, what is the port mode, if the mode is Pulse Width Modulation what is the Port Pulse Width Modulation rate for a given connected device, and which power bus (e.g., a flight critical power bus or a non-flight critical power bus) is used to power a given connected device. The user may specify or modify the various channel mappings and modes via the example user interface 810.

In the illustrated example, the user interface 810 identifies via attached device fields 812 four motors, e.g., Motors 1-4, attached to a first actuator control module (Actuator Control Module v1.0.6, ID:207) and identifies, via a mode interface, that the four motors are powered using a pulse width modulated output. The user interface further identifies, via a Port Pulse Width Modulation rate interface 814, a pulse width modulation rate, e.g., "400 Hz."

The user interface further identifies, via a power bus interface 816, that pulse width modulated power applied to the motors connected to the first actuator control module (Actuator Control Module v1.0.6, ID:207) is provided over the flight critical power bus, e.g., described above with reference to FIGS. 1-2. In this way, the UAV can ensure that the motors are always given power as they require it, e.g., by reducing power to payload modules described in FIG. 5.

The user interface 810 in this example also identifies via attached device fields 818 that an SBUS Device SBUS input, is attached to port 1 of a second actuator control module (Actuator Control Module v1.0.6, ID:475), and identifies, via a mode interface, that the SBUS Device is powered using a pulse width modulated output. The user interface further identifies, via a Port Pulse Width Modulation rate interface 820, a pulse width modulation rate, e.g., "400 Hz."

The user interface further identifies, via a power bus interface 822, that pulse width modulated power applied to the SBUS device connected to the second actuator control module (Actuator Control Module v1.0.6, ID:475) is provided over the flight critical power bus.

Upon a user selection of "Apply to Aircraft," the configuration utility checks the above selections for validity, e.g., ensuring every motor is assigned to an actuator port, ensuring no motor is assigned to more than one port, and ensuring the pulse width modulation rate and power bus 816 have both been selected and are at a frequency supportable by the UAV.

Figure 8C:
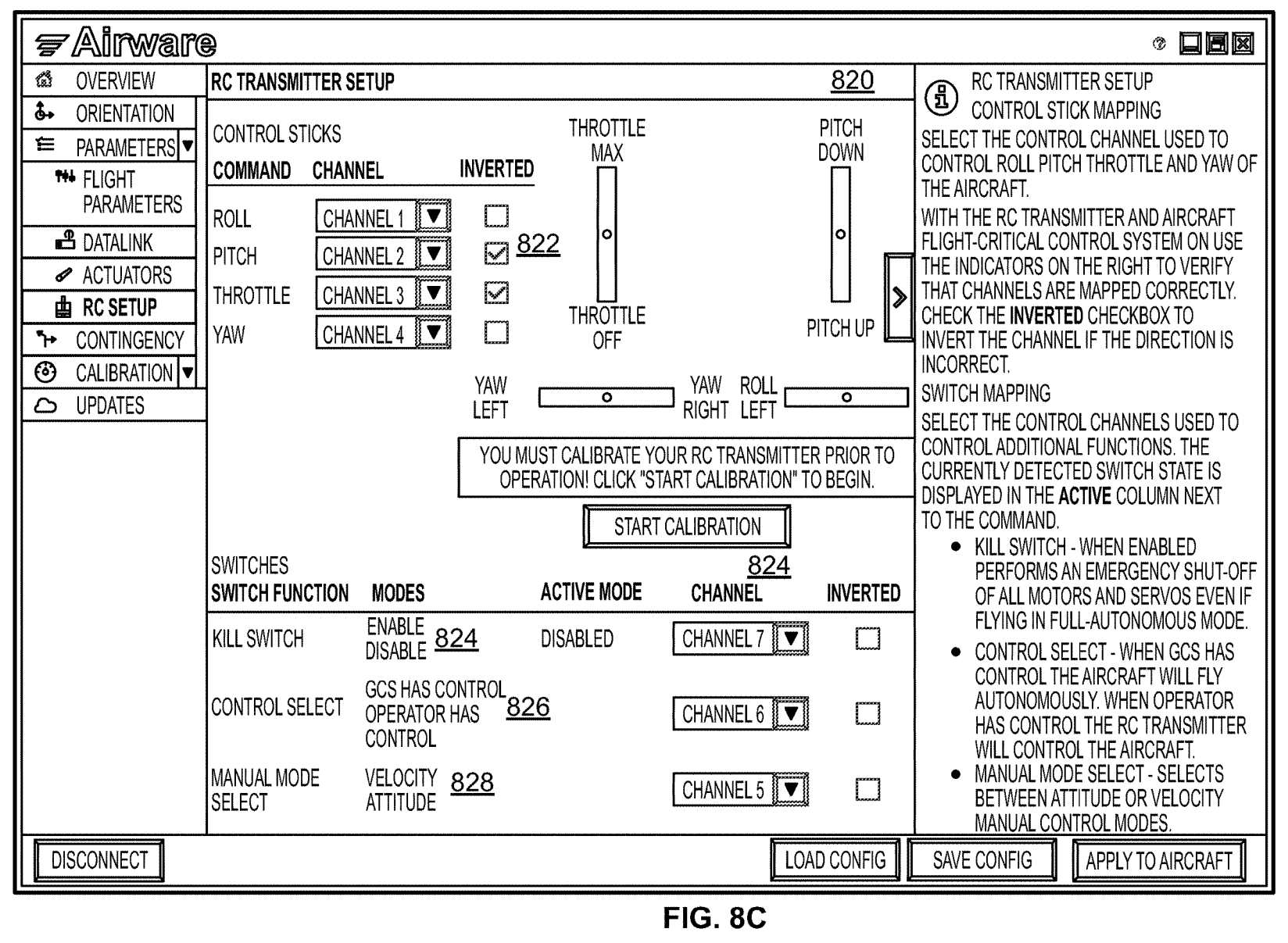

FIG. 8C includes an example user interface 820 generated by the configuration utility for configuring and validating radio control transmitter input settings. This user interface 820 allows a user to map a controller, e.g., a joystick, to specific channels of a radio on a UAV. As will be discussed, the example user interface 820 accesses and displays determined information, such as control mapping (e.g., the mapping of roll, pitch, yaw, and throttle commands to respective channels, and an indication as to whether a given channel is to be inverted), a mapping of switch functions (e.g., the mapping of kill, control select, manual mode select to respective channels), and an indication of the switch functions respective modes, and an indication as to whether a given switch channel is to be inverted. In addition, an interface may be provided enabling the calibration of a radio control transmitter with respect to the control of throttle, pitch, and/or roll. The user may specify or modify the various channel mappings and modes via the example user interface 820. Optionally, the system may map a given specified resulting action to one or more specified flight plans.

The example user interface 820 identifies four commands 822, e.g., Roll, Pitch, Throttle, and Yaw, mapped to four selectable channels, e.g., channels 1-4. The user interface also indicates whether one or more channels are inverted. The user interface 820 further includes range calibration of the controller, by a user selecting the start calibration option 824. Additionally, the user interface 820 includes one or more switches on the controller that are configured to trigger particular functionality, including an emergency shutoff of all motors 824, an autonomous flying option 826, and a manual flying option 828. The user may specify or modify the various channel mappings and modes via the example user interface 820.

The configuration utility validates the selections by ensuring that ensuring that each command 822 and switch 824-828 is mapped to a valid and active radio control channel.

Figure 8D:
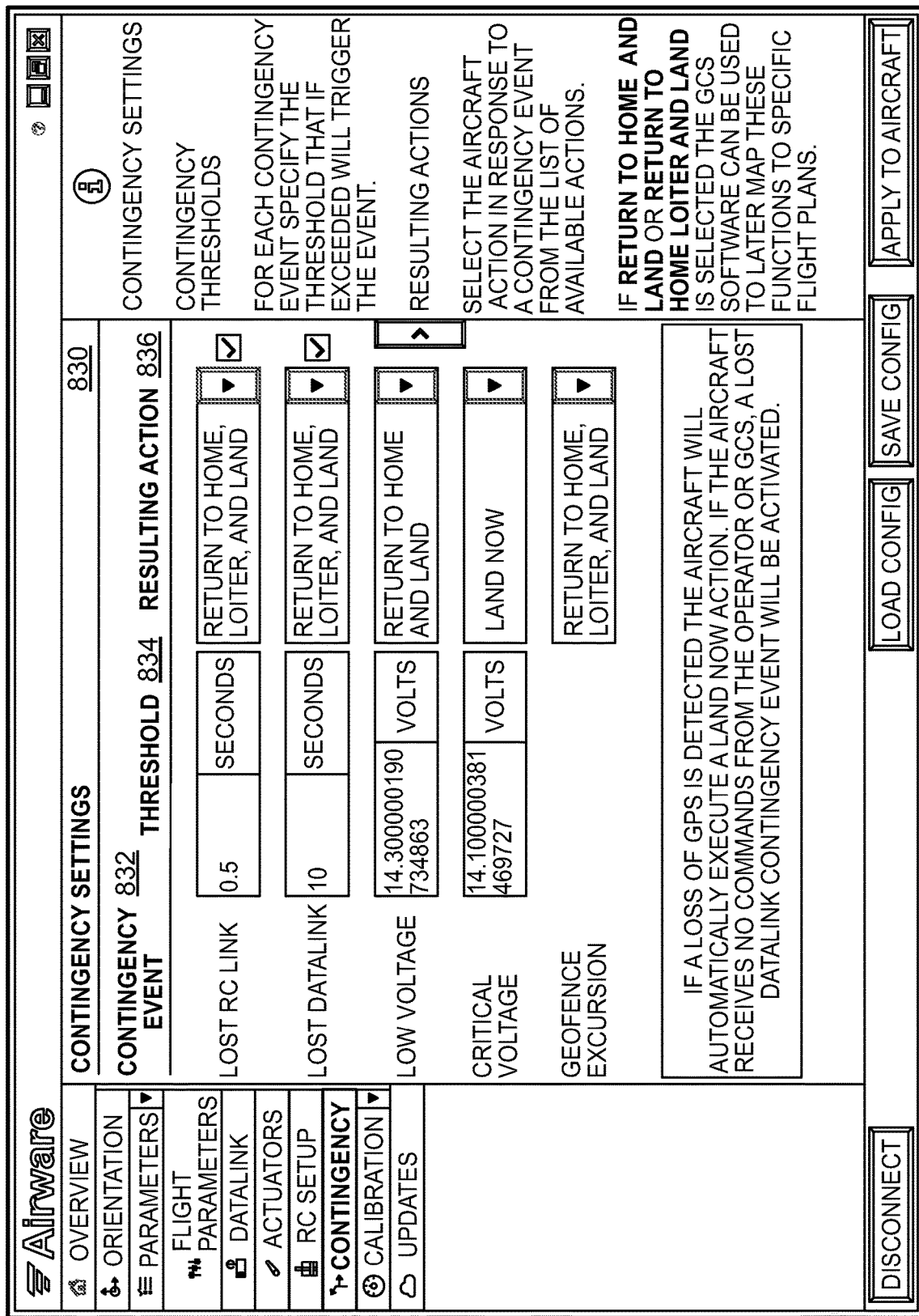
FIG. 8D includes an example user interface generated by the configuration utility for validating contingency identification thresholds and contingency response actions.

FIG. 8D includes an example user interface 830 generated by the configuration utility for validating contingency identification thresholds and contingency response actions. The user interface includes an identification of various contingencies 832, e.g., "Lost RC link", "Lost Datalink", "Low voltage", "Critical Voltage", "Geofence Excursion", mapped to minimum thresholds 834 that need to occur before a resulting contingency action 836 is taken by the UAV (e.g., return to home, loiter, and land; return to home and land; land now, etc.).

For instance, the example user interface 830 indicates that the contingency settings specify that if the UAV determines that it has lost a radio control link for greater than or equal to 0.5 seconds, the UAV is to alter its flight information to return to home, loiter, and land. The user may specify or modify the various thresholds and resulting actions via the example user interface 830.

The configuration utility validates each threshold 834 using pre-defined range limits for the associated parameter. The configuration utility checks the response actions 836 for validity by constraining the available selection options to only those that are applicable to the contingency. By way of illustration, in this example the only allowable response for Critical Battery Voltage is "Land Now", since the UAV is critically low on available battery power and cannot travel to a pre-specified home location before landing.

FIGS. 8A-8D describe examples of the configuration utility validating configurations of components, or behaviors, of the UAV and of interfaces via which a user can modify certain configurations or behaviors. This validation optionally includes validation of certain or all configuration parameters, including configuration parameters for UAV type, UAV layout, control parameters, safety and contingency settings, and/or others. Each parameter is optionally validated to be a reasonable value both in terms of absolute range, but also consistent with other parameter settings where applicable.

The configuration utility can also validate the configuration against specified or detected software, hardware, and firmware, of the UAV, to ensure that the configuration is correct and will behave properly.

Figure 9:
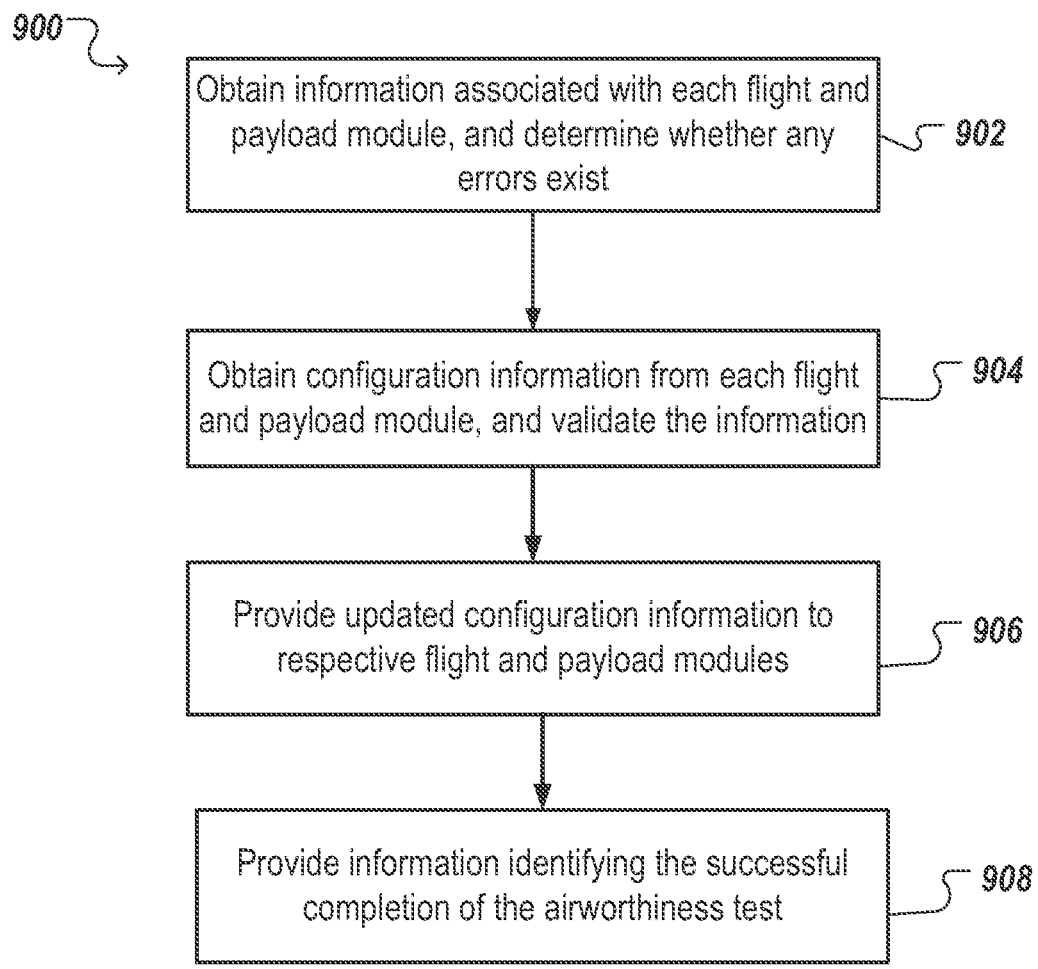
FIG. 9 is a flowchart of an example process for determining airworthiness of a UAV by the configuration utility.

FIG. 9 is a flowchart of an example process 900 for determining airworthiness of a UAV by the configuration utility.

The configuration utility analyzes information, e.g., type of UAV, aircraft calibration, detected flight and payload modules, configuration parameters, and/or UAV safety and contingency settings, to determine whether the UAV and the UAV's configuration are determined to be safe and airworthy.

To effect this determination, the example configuration utility obtains information associated with each flight and payload module, and determines whether any errors exist (block 902).

The configuration utility obtains information identifying some or all flight and payload modules that are connected, and properly receiving and providing data, to the UAV. For example, the configuration utility may query the UAV (e.g., by transmitting a request to the flight core processing system and/or the payload core processing system) for such information. The configuration utility then compares such information against a list flight and payload modules (e.g., a list of all flight and payload modules) that are supposed to be connected to the UAV. Optionally, the list can be included in a previously generated configuration file, which identifies configuration information of the UAV and associated flight/payload modules. Upon determining any discrepancy, the configuration utility provides, for presentation to a user, error information identifying one or more flight and/or payload modules that were not detected in the UAV but that are supposed to be present and connected.

Additionally, the configuration utility is optionally configured to provide information to a given flight and payload module to perform a self-test and report any errors back. If the configuration utility receives any errors, error information identifying the error is provided for presentation to the user.

The configuration utility obtains a list, e.g., from a configuration file, of identifying information, such as serial numbers, associated with the flight and payload modules that are supposed to be in the UAV, and checks whether the identifying information (e.g., serial numbers) are in conformance to identifying information (e.g., serial numbers) of the flight and payload modules actually in the UAV. If the configuration utility determines that a flight or payload module is associated with a serial number different than a serial number on the list, the configuration utility provides information identifying the discrepancy to the user.

The configuration utility obtains identifications of firmware, or other software, versions associated with the flight and payload modules in the UAV. The configuration utility checks these identifications against firmware, other software, versions identified in the previously generated configuration file. If the configuration utility determines there any discrepancies, the configuration utility provides information identifying the discrepancy to the user.

Optionally, any error or discrepancy, or alternatively certain errors or discrepancy identified as critical, determined, or identified, by the configuration utility causes the UAV to fail the airworthiness test.

The configuration utility obtains configuration information from each flight and payload module, and validates it, e.g., described above with reference to FIG. 8A-8D (block 904). As described in FIG. 8A-8D, the configuration utility can validate configuration settings selected for particular components of the UAV.

For each obtained configuration, the configuration utility validates the configuration. If the configuration utility determines any configuration settings are invalid, the user is provided with a user interface, e.g., user interfaces 800, 810, 820, 830, configured to allow for the changing of particular configuration settings.

After the user changes the configuration settings, the configuration utility re-validates the configuration, and determines whether the configuration of each component is valid. Upon a negative determination, the configuration utility provides information to the user identifying that the UAV did not pass the airworthiness test.

The configuration utility provides any updated configuration information to respective flight and payload modules (block 906). The configuration utility provides any updates to configuration information of any flight or payload module that had to be re-validated in step 904.

The configuration utility optionally computes a checksum e.g., a hash sum, of the configuration information, and directs each receiving flight or payload module to compute a same checksum upon receipt of the configuration information. The flight or payload modules then provide the computed checksum to the configuration utility, which determines whether there are any discrepancies. Upon a positive determination, the configuration utility provides the configuration to the flight or payload modules, until the checksum values agree.

Similarly, each flight or payload module receiving updated configuration information performs a self-test procedure. If the configuration utility receives an identification of an error resulting from the self-test procedure, the airworthiness test fails.

If the airworthiness test did not fail in steps 902, 904, and 906, the configuration utility provides information to the user identifying the successful completion of the airworthiness test (block 908).

Figure 10:
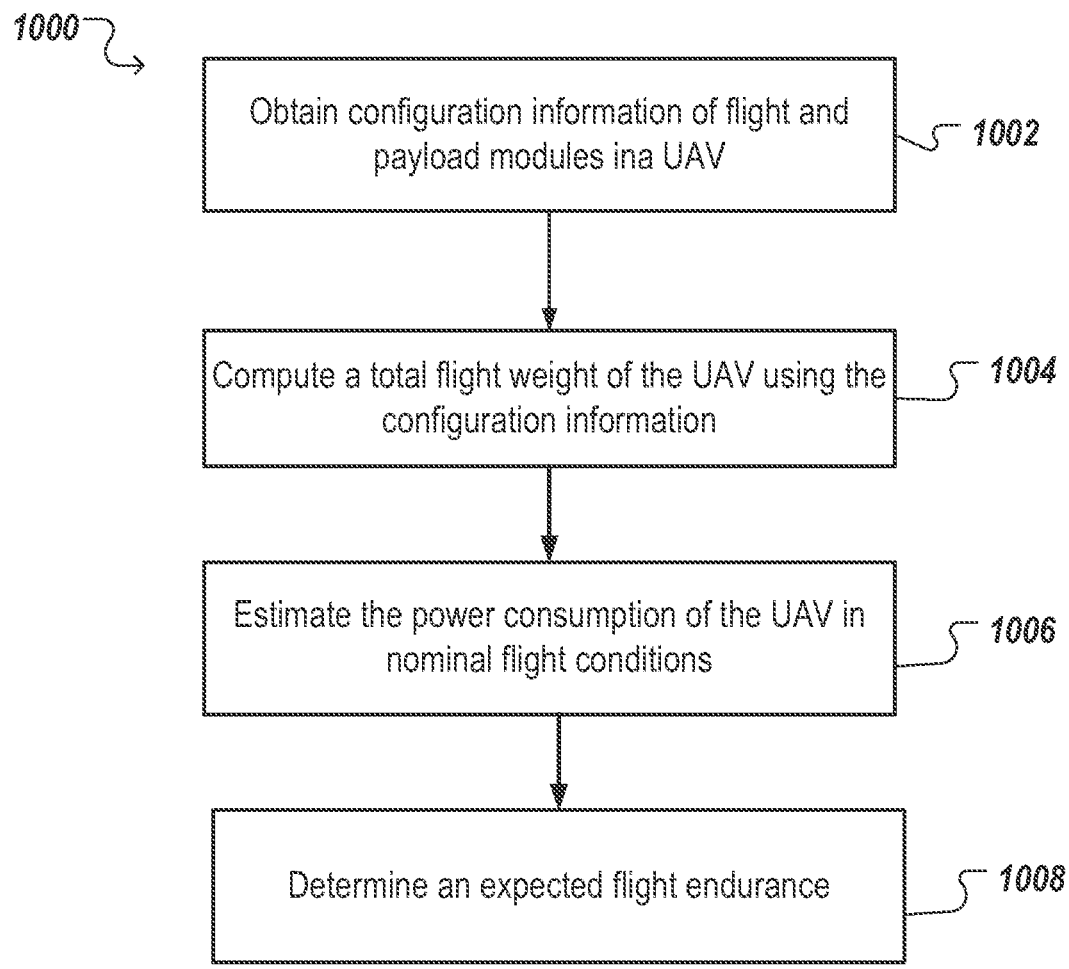
FIG. 10 illustrates an example process for determining an estimated maximum flight endurance of a UAV.

FIG. 10 illustrates an example process 1000 for determining an estimated maximum flight endurance of a UAV, e.g., based on its current configuration. The example process 1000 will be described as being performed by the configuration utility, described above.

The configuration utility obtains configuration information of flight and payload modules included in the UAV (block 1002). The configuration utility receives the configuration information, and generates a configuration file identifying each payload and flight module, e.g., with associated configuration information and/or weight information, and information describing the UAV, e.g., UAV type, battery type and chemistry, and so on.

The configuration utility computes a total flight weight of the UAV (block 1004). The configuration utility computes the total flight weight from a weight of all flight and payload modules, weight of UAV batteries, and weight of the UAV airframe.

To determine the weight of all flight and payload modules, the system identifies each flight and payload module in the configuration file, and sums the associated weights.

To determine the weight of the UAV batteries, the configuration utility optionally estimates the weight based on parameters including some or all of the following: battery chemistry, voltage and energy capacity parameters, e.g., obtained from the configuration file. The configuration utility then obtains information identifying batteries (e.g., commonly available commercial off-the-shelf (COTS) batteries) mapped to its weight. The configuration utility identifies a battery (e.g., a suitable COTS battery) with closest parameters, and obtains the estimated weight of the UAV batteries as the weight of the closest COTS battery. Optionally, an interface is provided via which the user can directly input the weight of the batteries.

To determine the weight of the UAV airframe, the configuration utility optionally estimates the weight using the aircraft type, e.g., multi-rotor helicopter, conventional fixed-wing, flying wing, and so on. The configuration utility then obtains information from a data source (e.g., a local or remote data store, such as a database of vehicle characteristics) identifying typical thrust-to-weight ratios of vehicle airframes, and determines an estimated weight using a closest airframe identified in the information. Optionally, an interface is provided via which the user can directly input the weight of the airframe.

The configuration utility then computes a sum of the above determined weights to obtain the total flight weight.

The configuration utility determines an estimated power consumption of the UAV in nominal flight conditions (block 1006). To estimate the power consumption, the configuration utility obtains the UAV airframe type, along with a number of locations of aerodynamic control effectors. For example, a multi-rotor airframe type would include the lifting rotors. In another example, fixed-wing and flying-wing airframe types would include control surfaces such as ailerons, elevator, rudder, flaps, and so on.

The configuration utility uses the airframe type and effector parameters to model the power consumption of the vehicle in flight (e.g., in nominal flight) given the total flight weight, e.g., determined above in step 1004. The configuration utility can model the power consumption using analytical calculations, e.g., physical formulas governing power consumption and efficiency of various airframe types, or using flight simulation software to gather simulated empirical data, e.g., the flight simulation software can be run using the same airframe type and same total flight weight.

From this modeled power consumption, the configuration utility can determine an estimated flight endurance using the battery capacity of the UAV, e.g., obtained from the configuration file.

Figure 11:
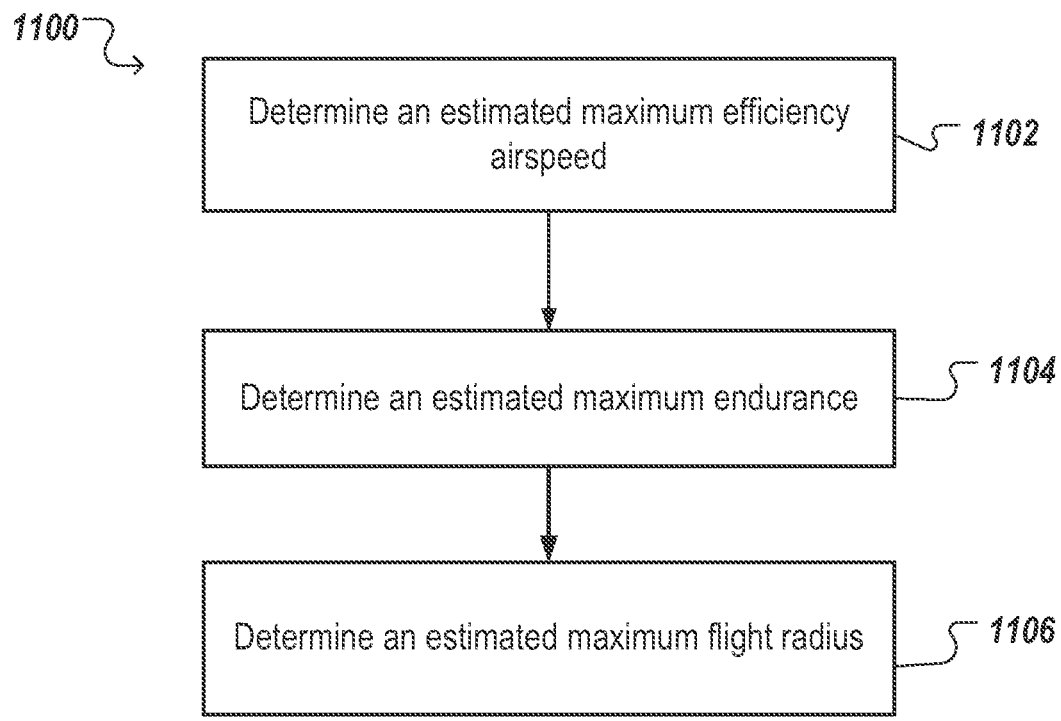
FIG. 11 illustrates an example process for determining an estimated maximum flight radius of a UAV.

FIG. 11 illustrates an example process 1100 for determining an estimated maximum flight radius of a UAV. The example process 1100 will be described as being performed by the configuration utility.

The configuration utility determines an estimated maximum efficiency airspeed (block 1102). The configuration utility communicates with the UAV to receive information associated with the UAV, e.g., flight and payload module information, airframe type and weight, default transit airspeed, and generate a configuration file.

The configuration utility obtains the default transit airspeed from the configuration file, and determines the estimated maximum efficiency airspeed of the UAV. The maximum efficiency airspeed is defined as the airspeed at which the lift-to-drag ratio is maximized for the given aircraft. Optionally, the default transit airspeed is assumed to be the maximum efficiency airspeed, or proportional to it, as the maximum efficiency airspeed maximizes economy of the UAV. Optionally, an interface is provided via which a user can provide the maximum efficiency airspeed.

The configuration utility determines an estimated maximum endurance of the UAV (block 1104). Determining an estimated maximum endurance is described above, with reference to FIG. 10.

The configuration utility determines an estimated maximum flight radius of the UAV (block 1106). To determine the estimated maximum flight radius, the configuration utility may compute a multiplication of the estimated maximum endurance by the estimated maximum efficiency airspeed, to obtain an estimated maximum distance the UAV can travel. Other factors may be taken into account as well.

The estimated maximum flight radius is computed as half or about half the estimated maximum distance.

Figure 12:
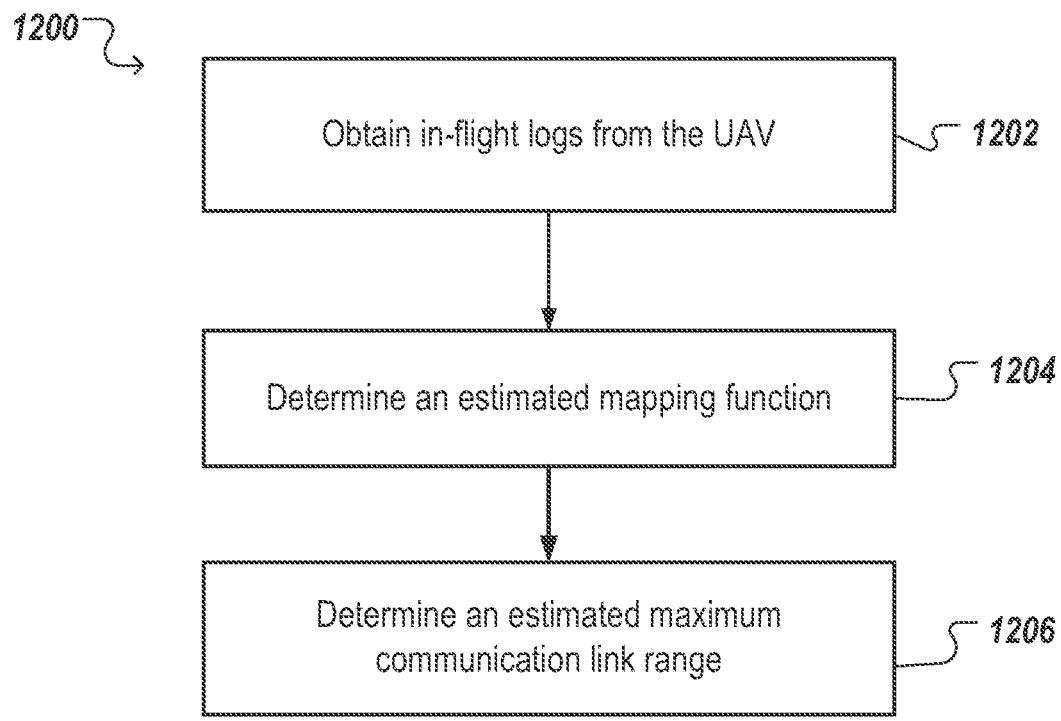
FIG. 12 illustrates a flowchart of an example process for determining an estimated maximum communication link range of a UAV.

FIG. 12 illustrates a flowchart of an example process 1200 for determining an estimated maximum communication link range of a UAV. The process 1200 will be described as being performed by a configuration utility.

The configuration utility obtains in-flight logs from the UAV (block 1202). The configuration utility communicates with a module, e.g., a UAV aircraft datalink module, to receive in-flight logs, e.g., logs generated by periodically sampling information describing flight information of the UAV.

For instance, the in-flight log can include periodic samplings of, a current distance, at the time of sampling, of the UAV from its base location where a ground datalink module is located, e.g., determined by the UAV from a difference between a current GPS location and a GPS location at a time of launch. The in-flight logs can include periodic samplings of a transmitting frequency setting of the aircraft datalink radio, along with transmitting power of the aircraft datalink radio. A Boolean value, e.g., true or false, indicating whether the aircraft datalink radio was able to communicate, at the time of sampling, with a ground datalink module may also be included.

The configuration utility determines an estimated mapping function that maps the in-flight log information (e.g., distance from launch location, transmitting power and frequency) to the Boolean indicator (block 1204). That is, the configuration utility determines a function that takes a distance of a UAV from a ground datalink, a UAV datalink transmission power and frequency, and determines whether the UAV is expected to be in communication with the ground datalink. To effect this determination, the configuration utility can utilize one or more function approximation methods, including least squares, neural networks, support vector machines, Bayesian approximation, and one or more Mixture Models, e.g., Gaussian mixture models.

The configuration utility determines the estimated maximum communication link range (block 1206). The configuration utility obtains the transmitting frequency and transmitting power setting of the datalink module in the UAV, e.g., from a configuration file that includes information describing flight and payload modules of the UAV. The configuration utility then determines the estimated maximum flight radius, e.g., described in reference to FIG. 11.

The configuration utility then evaluates the determined mapping function at distances, from a ground datalink, ranging from zero distance to the maximum estimated flight radius using the obtained transmitting power setting and transmitting frequency. The configuration utility determines the estimated maximum communication link range as the distance in which the mapping function maps to a Boolean True. If the mapping function maps to a Boolean true at distances that exceed the maximum estimated flight radius, the configuration utility increases the maximum estimated flight radius.

Cloud Functionality

A cloud system, e.g., one or more computers in communication with one or more databases or storage systems, accessible over a network can receive configuration information of UAV's, e.g., over the Internet, and store the configuration information with associated identifiers, or metadata, describing the UAV. A user can then search the cloud system, e.g., through a front-end website in communication with the cloud system, for previously created configuration information. Configuration information of a UAV is described above, with reference to FIG. 7 and FIG. 8.

A user can create configuration information for a particular UAV, e.g., through the use of one or more user interfaces illustrated in FIGS. 8A-8D, and provide the created configuration information, e.g., as a configuration file, for storage by the cloud system. In this way, the user can later obtain the created configuration file, or provide the configuration file to other users. This enables other users to re-use configurations that have been tested or proven to work on a same or similar UAV.

Since a user might desire to utilize a previously created configuration file on his/her UAV, the user has to ensure that the configuration information, in the configuration file, will apply to his/her specific UAV. If there are any differences between his/her UAV and the UAV associated with the configuration file (e.g., different aircraft type, different flight or payload modules), the system may highlight these differences to the user via a user interface and, in some cases, automatically modify and fix the configuration file for use with the user's specific UAV.

Figure 13:
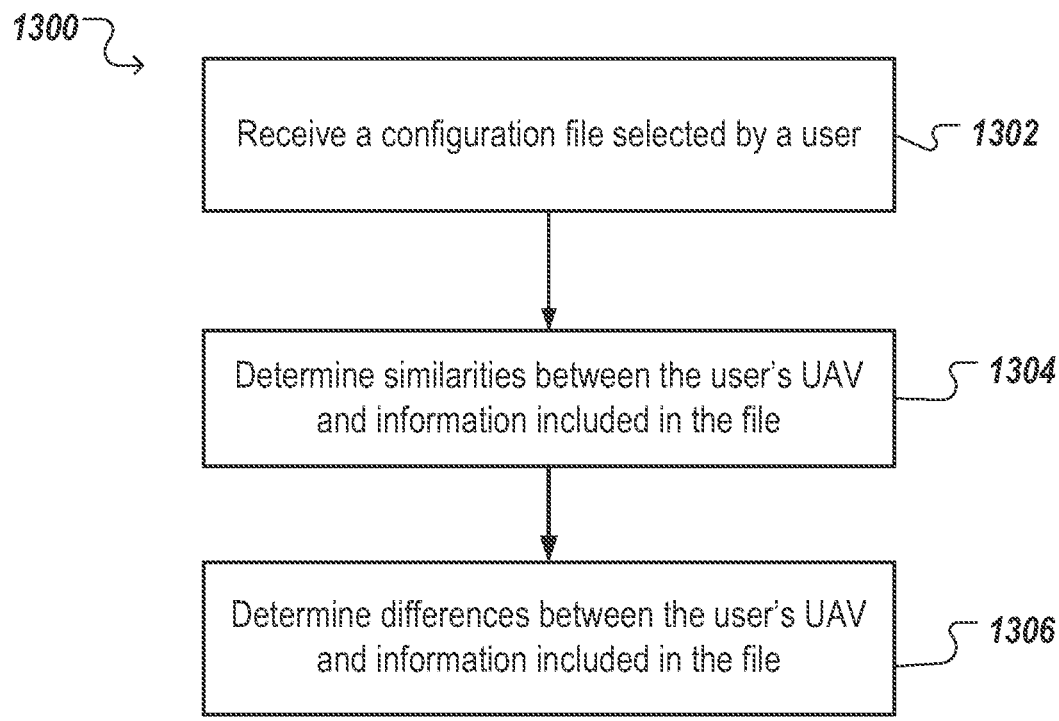
FIG. 13 is a flowchart of an example process for processing a configuration file received from a cloud system.

FIG. 13 is a flowchart of an example process 1300 for processing a configuration file received from a cloud system. The process 1300 will be described as being performed by a configuration utility, e.g., described above with reference to FIG. 7.

The configuration utility receives a configuration file selected by a user from the cloud system (block 1302). As described above, the cloud system can store previously created configuration files, e.g., a file that includes configuration information for a particular UAV, associated with respective metadata, e.g., labels or identifiers of specific UAV types, payload and flight modules, and so on. Users can submit the configuration files for storage on the cloud server, and configure the file to be available by other users (e.g., by specifying that the configuration file is to be shared with all users or with specific users or specific sets of users (e.g., only users from the same company as the user). Optionally, an interface may be provided enabling the submitting user to enter the metadata, and optionally the cloud system can be configured to automatically parse the configuration file to generate metadata.

After selection of the configuration file, the configuration utility receives the configuration file and begins processing. The configuration utility also obtains information identifying the user's UAV, including aircraft type, flight and payload modules, and so on.

The configuration utility determines similarities between the user's UAV and information included in the configuration file (block 1304).

The configuration utility determines whether some or all of the following, non-exhaustive, list of aspects of the user's UAV are similar to information included in the configuration file. For instance, the configuration utility examines the aircraft type, aircraft manufacturer and model, aircraft safety equipment (e.g., emergency parachute device, transponder beacon, emergency locator beacon), flight controller module firmware version, number of actuator modules and respective firmware version, number and type of navigation modules and respective firmware version (e.g., GPS module or Inertial Measurement Unit module), and number and type of Datalink modules and respective firmware of each module.

For any aspect of the user's UAV that is determined to be similar, the configuration information from the received configuration file are applied to the user's UAV, e.g., applied to respective flight and payload modules. For example, if two actuator modules are included in the user's UAV, and two actuator modules with identical firmware versions are identified in the received configuration file, the parameters from the two actuator modules in the configuration file are automatically applied to the actuator modules in the user's UAV.

The configuration utility recommends parameters for aspects of the user's UAV not found to be similar (block 1306).

For instance, if the configuration utility identifies flight or payload modules of an identical type in the user's UAV and configuration file, but with different firmware versions, the configuration utility can copy parameters from the received configuration file to the user's module that are common between the two firmware versions. However, parameters that are different between the two versions are identified to the user, and the user can configure them.

If the configuration utility determines that two modules of different type are found, but that have identical configurable parameters, the parameters from the module in the received configuration file can be automatically loaded on the user's module. For instance, the user's UAV type may be a 4-rotor multi-rotor, and the UAV type associated with the received configuration file may be an 8-rotor multi-rotor. While the two configurations are different, they may share many of the same parameters, for example performance limits like maximum forward speed, default ascent/descent rates, and maximum commanded attitude. These common parameters can be automatically set in the user's UAV configuration. However, the user may still need to configure parameters that are not common between the two modules.

If the configuration utility determines that two modules include similar functionality, the user's module can be configured with parameters associated with the similar module identified in the received configuration file. For example, the user's UAV may have a GPS module, and the module identified in the received configuration file may be a differential GPS module with a magnetometer. Since the two modules share many of the same abilities and functions, e.g., both compute locations using GPS signals, parameters associated with the similarities in function can be automatically provided to the user's module from the configuration file. However, the user may still need to configure parameters that are not related by similar functionality.

If the received configuration file includes additional modules or aspects that are not part of the user's UAV, the configuration utility will discard the additional modules and aspects.

Figure 14:
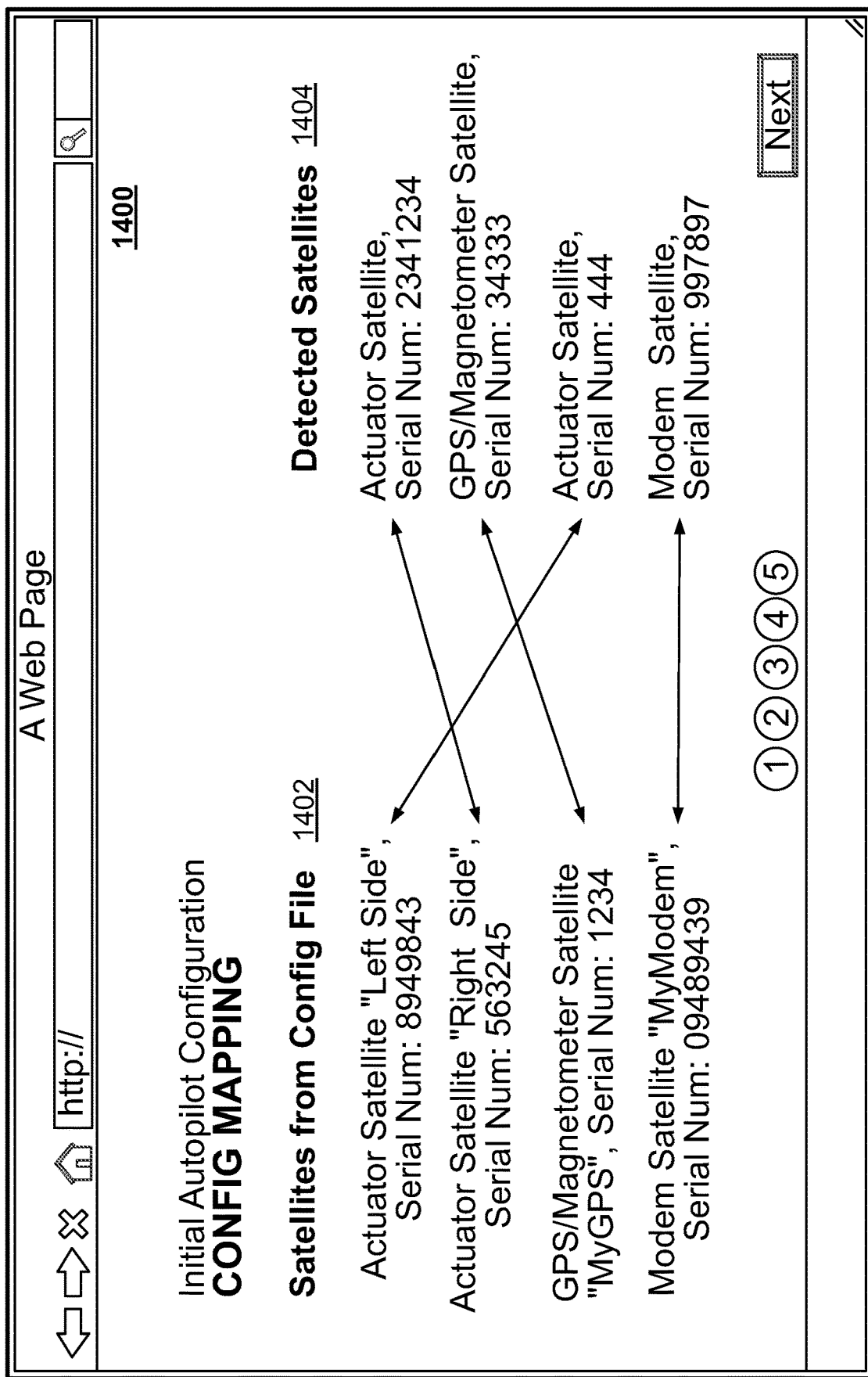
FIG. 14 illustrates an example user interface identifying the processing of a configuration file received from a cloud system.

FIG. 14 illustrates an example user interface 1400 identifying the processing of a configuration file received from a cloud system. The user interface 1400 can be generated by the configuration utility upon receipt of a configuration file received from the cloud system, e.g., described above with reference to FIG. 13.

The user interface includes an identification of satellites, e.g., modules, identified in the configuration file, and satellites, e.g., modules, in a user's UAV. The user interface 1400 includes mappings between the two satellites 1402 and 1406, identifying similar satellites.

While, for illustrative purposes, the foregoing description and figures may refer to a UAV, techniques, systems, and processes disclosed herein may be applied to other vehicles, including other aerial vehicles and to manned or unmanned land or sea vehicles.

Each of the processes, methods, and algorithms described in the preceding sections may be embodied in, and fully or partially automated by, code modules executed by one or more computer systems or computer processors comprising computer hardware. The code modules (or "engines") may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

In general, the terms "engine" and "module", as used herein, refer to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the risk assessment system 100, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

User interfaces described herein are optionally presented (and user instructions may be received) via a user computing device using a browser, other network resource viewer, a dedicated application, or otherwise. Various features described or illustrated as being present in different embodiments or user interfaces may be combined into the same embodiment or user interface. Commands and information received from the user may be stored and acted on by the various systems disclosed herein using the processes disclosed herein. While the disclosure may reference to a user hovering over, pointing at, or clicking on a particular item, other techniques may be used to detect an item of user interest. For example, the user may touch the item via a touch screen, or otherwise indicate an interest. The user interfaces described herein may be presented on a user terminal, such as a laptop computer, desktop computer, tablet computer, smart phone, virtual reality headset, augmented reality headset, or other terminal type. The user terminals may be associated with user input devices, such as touch screens, microphones, touch pads, keyboards, mice, styluses, cameras, etc. While the foregoing discussion and figures may illustrate various types of menus, other types of menus may be used. For example, menus may be provided via a drop down menu, a tool bar, a pop up menu, interactive voice response system, or otherwise.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y and at least one of Z to each be present.

While certain example embodiments have been described, these embodiments have been presented by way of example only, and are not intended to limit the scope of the disclosure. Thus, nothing in the foregoing description is intended to imply that any particular element, feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. An unmanned aerial vehicle (UAV) system, comprising one or more processors and one or more computer storage media storing instructions that when executed by the one or more processors, to cause the one or more processors to perform operations comprising:
    obtaining flight information of the UAV;
    determining one or more modifications based on the flight information; and
    transmitting data messages over data buses based on the one or more modifications.

2. The system of claim 1, the operations further comprising:
    blocking transmission of a type of data based on the one or more modifications.

3. The system of claim 2, wherein the flight information includes a contingency condition.

4. The system of claim 3, wherein the contingency condition is associated with a lost global positioning system lock, and wherein the type of data comprises data associated with one or more data transmission radios.

5. The system of claim 1, wherein the one or more modifications comprises any of restricting, throttling, blocking and prioritizing the data messages.

6. The system of claim 1, wherein the data messages transmitted from or to flight critical payload modules are prioritized on the data buses.

7. The system of claim 1, wherein the flight information includes a present flight phase, and wherein the one or more modifications comprises storing the data messages and providing the data messages to an intended target upon an occurrence of a different flight phase.

8. The system of claim 1, wherein the flight information includes a present flight phase associated with the UAV being inflight, and wherein the one or more modifications comprises restricting the data messages from one or more payload modules not currently needed during the present flight phase.

9. The system of claim 1, wherein the one or more modifications comprises throttling the data messages from a payload module, and wherein the payload module is limited to a data rate of transmission on the data buses.

10. The system of claim 1, wherein the one or more modifications comprises causing the data messages to not be delivered to an intended target or to not be delivered for a certain period of time.

11. The system of claim 1, wherein one or more payload modules associated with respective software processes use the data buses, and wherein the one or more modifications comprises any of restricting, throttling, blocking and prioritizing delivering of the data messages from, or to, the software processes.

12. A method, comprising:
    obtaining flight information of an unmanned aerial vehicle (UAV);
    determining one or more modifications based on the flight information; and
    transmitting data messages over data buses based on the one or more modifications.

13. The method of claim 12, further comprising:
    blocking transmission of a type of data based on the one or more modifications.

14. The method of claim 13, wherein the flight information includes a contingency condition that is associated with a lost global positioning system lock, and wherein the type of data comprises data associated with one or more data transmission radios.

15. The method of claim 12, wherein the one or more modifications comprises any of restricting, throttling, blocking and prioritizing the data messages.

16. The method of claim 12, wherein the data messages transmitted from or to flight critical payload modules are prioritized on the data buses.

17. The method of claim 12, wherein the flight information includes a present flight phase, and wherein the one or more modifications comprises storing the data messages and providing the data messages to an intended target upon an occurrence of a different flight phase.

18. The method of claim 12, wherein the flight information includes a present flight phase associated with the UAV being inflight, and wherein the one or more modifications comprises restricting the data messages from one or more payload modules not currently needed during the present flight phase.

19. The system of claim 1, wherein the one or more modifications comprises throttling the data messages from a payload module, and wherein the payload module is limited to a data rate of transmission on the data buses.

20. A computer program product, encoded on one or more non-transitory computer storage media, comprising instructions that when executed by a system, comprising one or more computers, cause the system to perform operations comprising:
  obtaining flight information of an unmanned aerial vehicle (UAV);
  determining one or more modifications based on the flight information; and
  transmitting data messages over data buses based on the one or more modifications.

\* \* \* \* \*